(12) United States Patent
Hartley et al.

(10) Patent No.: US 6,532,465 B2
(45) Date of Patent: Mar. 11, 2003

(54) OPERATIONAL SYSTEM FOR OPERATING ON CLIENT DEFINED RULES

(76) Inventors: Bruce Hartley, 12530 Kenedo Dr., Elbert, CO (US) 80106; Frank Ricotta, 2465 Rossmere St., Colorado Springs, CO (US) 80919; Jim Vanderwall, P.O. Box 18W, Denver, CO (US) 80218; Tony Locke, 9170 Bellcove Dr., Colorado Springs, CO (US) 80920; Tony Perkins, 1095 Claire La., Northglenn, CO (US) 80234; Rodney Brown, 9744 Canberra Ct., Highlands Ranch, CO (US) 80126

( * ) Notice: Subject to any disclaimer, the term of this patent is extended or adjusted under 35 U.S.C. 154(b) by 0 days.

(21) Appl. No.: 09/827,991

(22) Filed: Apr. 5, 2001

(65) Prior Publication Data

US 2001/0032207 A1 Oct. 18, 2001

Related U.S. Application Data

(63) Continuation of application No. 09/267,589, filed on Mar. 12, 1999, now abandoned.
(60) Provisional application No. 60/091,270, filed on Jun. 15, 1998, and provisional application No. 60/077,725, filed on Mar. 12, 1998.

(51) Int. Cl.[7] ............................................... G06F 17/30
(52) U.S. Cl. ............................................. 707/10; 709/1
(58) Field of Search ........................... 705/40; 707/10; 709/1

(56) References Cited

U.S. PATENT DOCUMENTS

| | | | |
|---|---|---|---|
| 4,315,310 A | | 2/1982 | Bayliss et al. .............. 364/200 |
| 5,416,917 A | * | 5/1995 | Adair et al. .................. 707/10 |
| 5,548,756 A | | 8/1996 | Tantry et al. ............... 395/600 |
| 5,553,127 A | | 9/1996 | Norell ........................ 379/20.7 |
| 5,699,528 A | | 12/1997 | Hogan ........................... 705/40 |
| 5,706,434 A | | 1/1998 | Kremen et al. ......... 395/200.09 |
| 5,706,502 A | | 1/1998 | Foley et al. ................. 395/610 |
| 5,796,952 A | | 8/1998 | Davis et al. ................. 709/224 |
| 5,799,309 A | | 8/1998 | Srinivasan ................... 707/102 |
| 5,809,505 A | | 9/1998 | Lo et al. ...................... 707/102 |
| 5,987,454 A | * | 11/1999 | Hobbs .......................... 707/10 |
| 6,085,198 A | * | 7/2000 | Skinner et al. ............. 707/101 |
| 6,119,104 A | * | 9/2000 | Brumbelow et al. .......... 186/37 |
| 6,266,701 B1 | * | 7/2001 | Sridhar et al. .............. 370/465 |

\* cited by examiner

*Primary Examiner*—Jack Choules
(74) *Attorney, Agent, or Firm*—Blakely, Sokoloff, Taylor & Zafman LLP

(57) ABSTRACT

The disclosure includes a computational system implemented with respect to a novel computational architecture for operating an externally-defined data based on client-defined rules. In one of the implementations, the architecture is utilized in a billing and customer service program. The architecture includes a engine unit which includes a number of processing modules which internally operate on generic data units that are independent of the particular application. A metadata engine receives externally-defined data and relates the externally-defined data and the relates the externally-defined data to the generic data units for use for the engine unit. A rules-based engine provides to the engine unit information related to the client defined rules. In this manner, the engine unit can be reused in a large part in a variety of different environments.

35 Claims, 19 Drawing Sheets

OPERATIONAL SYSTEM FOR OPERATING ON CLIENT DEFINED RULES

CROSS-REFERENCE TO RELATED APPLICATIONS

This application is application is a continuation of prior application Ser. No. 09/267,589, filed on Mar. 12, 1999 now abandoned.

This is related to U.S. provisional application No. 60/077,725 filed on Mar. 12, 1998 and U.S. provisional application No. 60/091,270 filed on Jun. 15, 1998, both of which are incorporated herein.

FIELD OF THE INVENTION

The present invention relates in general to computational systems, i.e., computer-based processing systems implemented in logic including software, hardware and/or firmware. In particular, the present invention relates to computational systems for operating on externally-defined data content or data formats (hereinafter "externally-defined data"), such as records generated in a business environment, based on client-defined rules and metadata. The invention is particularly useful in developing and operating computational systems that are readily adapted to perform various functions in different operating environments, for example, billing programs that can be adapted for different business environments.

BACKGROUND OF THE INVENTION

In many cases, computing systems are required to operate on externally-defined data, e.g., business information, market information, scientific data, environmental data or other information having a content and/or format determined in relation to external or real world events. The computing systems perform operations on the externally-defined data that are as varied as the data and the environments associated with the data. These operations may depend, in part, on client-based rules, that is, rules defined by the client (e.g., party for whom the computing system was developed, or on whose behalf the computing system is operated) governing processing of the data. Accordingly, the computer systems and the algorithms implemented by the computer systems are typically developed on a case-by-case basis, and are limited to the specific application for which they were developed.

In recent years, programmers have devoted considerable effort to developing programs that are somewhat adaptable to different situations so as to reduce the need to create and reprogram source code. Some examples of such adaptable programming include configurable systems and object oriented programming (OOP). Configurable systems typically allow the user to select from various options, e.g., a menu of options, to customize the system for a given situation. The related configuration files may contain, for example, information regarding specific users, specific computers or specific programs related to the given situation. OOP generally involves programming using objects, i.e., self-contained software modules that can be used as independent building blocks. Each object includes the commands and data required to perform particular functions in response to appropriate messages from other objects or systems. Generally, new objects of a particular class inherit certain characteristics of the existing objects. These objects can be re-used or modified to address varying programming situations thereby reducing the need, in certain cases, to create software routines from scratch.

However, the degree of adaptability that is accommodated by such programming is generally somewhat limited. Configurable systems typically support only customization with respect to selected option types or from pre-programmed option fields. Similarly, objects in OOP can be used and reused as building blocks but generally only within specific operation contexts. As a result, even programmers taking advantage of the adaptability afforded by configurable systems and OOP are generally limited to writing application-specific programs. That is, at some point in such programs within the binary code, the engines that perform the various functions of the program include application-specific elements. Accordingly such engines, although perhaps providing significant adaptability, are application-specific engines and would require substantial code revision to be re-used in other applications.

The case of business software and particularly billing programs, is illustrative. These programs are designed to provide billing information for particular business environments where something is rated and billed. However, the specific business environments are as varied as the companies and industries in which they exist. The differences include, for example, industry-related factors and organization-related factors.

Among other things, industry-related factors may relate to the thing being billed and the format of available business records. By way of example, the thing being billed may be measured in minutes (e.g., of air time, on-line time, worker time spent on a project, etc.), volume or quantity of a material or commodity (cubic feet of natural gas, or kilowatt hours used, number of securities traded, etc.) or in terms of monetary units (size of transaction on which commission, royalty or service fee is due). The usage or other billing information may be provided in an industry standard or proprietary format, e.g., a call detail record or similar record of a telecommunication network. Accordingly, billing programs are generally designed on a case-by-case basis to handle particular types of data and specific data formats.

Organization-related factors relate to various billing rules that are specific to an organization or client. Examples include: billing rates that vary depending on time of day or day of the week; commission structures that vary depending on the type or size of the transaction, volume or commission sharing rules; company rules governing personal versus business expenses; internal bookkeeping rules concerning distribution of expenses and receipts as between departments or other units of an organization, etc. It is thus apparent that billing programs, in addition to addressing data types and data formats that vary from industry-to-industry (or company-to-company), must also address organization-related factors that vary from company-to-company. Similar variations are present in a wide-variety of other programming environments.

In the context of billing programs, companies generally use either an off-the-shelf billing program or have a program custom developed. Unfortunately, off-the-shelf programs generally have a limited ability to address industry-related and organization-related variations such as described above. Some of these available programs include a limited ability to customize user interface screens or billing reports, but the programs generally support only a small number of pre-defined business models corresponding to particular algorithms that are pre-coded into the programs.

Dissatisfied with the limitations of off-the-shelf programs, some companies have had billing programs custom-developed for particular applications so as to support externally-defined data according to client-defined rules. For example, a telecommunications company wishing to develop a billing program for use in billing its customers, might contract with an outside software developer. The developer would spend the time required to understand the data content and data format as received by the company. In the telecommunications industry, such data may be presented in the form of call detail records or similar records generated by a switch operator on a per call basis including, inter alia, time that the call started, time that the call terminated, the phone number called, and caller's phone number, the MIN/ESN or other information identifying the caller to be billed. In addition, the software developer would spend time learning the company's billing rules including different rates based on time of the day and day of the week, different rates depending on the customer's billing plan, different rates depending on the billing zones (e.g., area codes) of the call and variable rating as a function of call duration. Based on all of this information, the developer would then design a billing program, and write specific algorithms into code that take into consideration the relevant data, data formats and billing rules. After a preliminary version of the program is written into code, the code would generally be tested, revised, debugged and otherwise developed, typically during an extensive testing period, until the company had sufficient confidence in the program to implement it in the company's regular billing system.

The process for developing custom code on a per application basis is expensive, disruptive to the company's business, and unreliable. In particular, the developer must devote a large amount of time, at the company's expense, to learning the company's business, writing code starting from basic principles, and developing the code into a functioning product. Significant company resources are often devoted to educating the developers, providing test data, analyzing the test results and troubleshooting the program. In addition, due to the complexity of developing custom code from basic principles, the resulting programs are prone to errors or inadequate performance and may take significant time to develop into satisfactory products. Because billing programs are close to the heart of a company's profitability and its relationship with its customers, this is a matter of serious concern to companies. Nonetheless, this development process has been thought an inherent difficulty of obtaining a computing system having the ability to fully address the needs of a specific operating environment and provide the level of service that some companies or individuals demand.

SUMMARY OF THE INVENTION

It has been recognized that, in a variety of settings, there is a need for reliable and readily developed computing systems that support externally-defined data and/or that support data handling according to client-defined rules. The present invention is based in part on an understanding that many operating environments involving externally-defined data and/or client-defined rules and metadata can be addressed by computing systems including: 1) a generalized functional platform having functional elements or "engines" that perform functions of given types on generic computational units independent of the specific application involved, in combination with 2) application-specific modules that receive externally-defined data and/or client-defined rules, operate the engines based on these application-specific inputs, and output computed data having an application-specific content or format. In this manner development time frames are substantially contracted with corresponding cost reductions, and system reliability is greatly enhanced, due to the ability to re-use the generalized platform.

It will be appreciated that the invention encompasses an adaptability that is qualitatively and quantitatively different than conventional techniques/systems such as OOP and configurable systems. In particular, the computing system of the present invention includes functional engines that work independent of any application-specific elements. Accordingly, these engines can be transferred from one application to another without reprogramming any such application dependent elements. Similarly, the application-specific modules interact with the functional engines in a manner that is different from conventional messaging-related interaction. For example, whereas messaging has conventionally been used to effectively call a pre-programmed function of a particular type that may be used multiple times in a particular application, or may be used to create new records that inherit certain attributes of other records based on the particulars of an application, the application-specific modules of the present invention interact with the engines in a manner that determines what type of application the engines operate within. That is, the application-specific modules "tell" the engines what kind of application to become. In one case, certain application-specific modules may cause the engines to function as part of a billing system for a cellular communications network. In another case, other application-specific modules may cause the same engines to function as a crude oil pricing application. This transformation of functionality can be based on both externally-defined data and client-defined rules.

In accordance with one aspect of the present invention, an apparatus may include: a processing unit for performing computation-based functions on generic data units independent of the particular data processing application; an input device for receiving an application-specific input relative to the particular data processing application; a memory, accessible by the processing unit, for storing the application specific input such that the processing unit can perform the computation based functions on the generic data units based on the application-specific input so as to generate computed data; and an output device associated with the processing unit for providing an application-specific output based on the computed data.

The processing unit may be Incorporated in a network service which implements algorithms corresponding to the computation based functions of the generalized platform. The input device may include a graphical user interface device for accessing a store of data (e.g., a look up table) relating externally-defined metadata to the generic data units and/or client-defined rules for use by processing a unit. The memory includes a computer memory configured to store the application-specific input for use by the processing unit. The output device may include one or more of a GUI's or other processing devices which relate the computed data to an application-specific output.

In another aspect of the invention the system may be arranged in a multitier structure. A multitier structure may provide the functionality to perform more application specific processes at the tiers closest to the users, while increasingly abstract functions are performed at a central location near the base. Located at the base may be a central server which includes a database. The base server may be connected to at least one application server located at an intermediate tier. The application server may perform functions relevant to the location it is serving, while the central server may provide services for all parts of the system.

The uppermost tier may include client nodes which act as the interfaces between the system and the system users.

Through the client node, system users may enter application specific data, such as rules data and definitions, and receive outputs related to the processes performed therein.

As part of the multi-tier system, a data synchronization scheme may be employed which includes the functionality to store subsets of information which have a high probability for use at a tier closer to the client node. Rules are provided which are either predetermined or adaptive in nature which identify information which may be of high demand during a particular encounter, and back fills this information from the base tier to the intermediate tier during the encounter.

In yet another aspect of the invention, the invention described herein may be implemented as an object oriented system which employs various objects which process data at different levels of abstraction between the client node and the base tier. Presentation objects in the uppermost tier may correspond to one or more business objects that are highly specific to a client's implementation. These objects may be focused toward supporting user interfaces, report writers, etc. Mapping may be provided between the presentation objects and business objects located on an intermediate tier. The business objects may contain key abstracted business logic supported by the particular implementation of the system. Contained within these objects may be the metadata and rules necessary to drive the processing engines.

Mapping may further be included between the business objects and domain objects located on the base tier. The domain objects may correspond closely to a data model entity or an entity obtained through an external source. The domain objects facilitate the location of data required by the presentation and business objects in a database.

In another aspect of the invention, the apparatus performs various billing and customer service related functions. Under direction from the application specific modules, the functional engines use the customer defined rules to perform a variety of functions. These function may include a number of processes related to customer summary information, commitment management, translation, billing and rating, recurrent charges, revenue management, output management, and billing summary.

In another aspect of the invention, a method is provided for enabling a generalized processing platform to be used for supporting particular processing applications. The method involves providing, as part of a computing program for supporting a particular data processing application, a generalized platform for performing computational-based functions on generic data units. The generic data units are expressed in terms independent of the particular data processing application. For example, in the case of a business application for billing and customer service, the generalized platform may include functional components for performing rating and billing functions. The generic units may be defined as dimensionless parameters such as rating parameters and customer usage parameters, which do not depend on the nature of the thing being billed, e.g., whether it is defined in a business environment in terms of time, volume, kilobytes per second, etc.

The method further involves receiving an application-specific input relative to the particular data processing application, operating the generalized platform based on the application-specific input to generate computed data, and providing an application-specific output based on the computed data. The received application-specific input includes at least one of externally-defined data (e.g., billing records provided in an industry standard or company format) and client-defined rules (e.g., billing rate information). The application-specific output includes at least one of a data content and a data format that is specific to the particular data processing application. For example, the output may include billing information expressed in terms appropriate to the billing application in an organization's billing format. The output may be provided in the form of a transmitted data signal, a printed billing statement or an electronically transmitted billing statement.

According to another aspect of the present invention, a method is provided for processing externally-defined billing and customer service related data for use by a generalized processing platform. The method includes the steps of providing a generalized processing platform for performing billing related functions on generic units, receiving externally-defined customer usage data relative to a particular billing application, and translating the externally-defined customer usage data into generic units for use by the generalized processing platform. The externally-defined customer usage data includes an externally-defined data content (e.g., in units of the thing being billed) and/or an externally-defined data format (an industry standard or proprietary format). The method allows such externally-defined information to be used by a generalized processing platform that is not specifically adapted for or limited to the particular billing application.

DESCRIPTION OF PREFERRED EMBODIMENTS

The method and apparatus of the present invention, as implemented in connection with the architecture described in detail below, is applicable to a wide variety of applications for handling externally defined data or for handling data based on client defined rules. Examples of such applications include various business, science, process control equipment, and engineering applications. In particular, the present invention is advantageous in the context of developing, customizing and operating computing systems for a number of different applications that share certain functional similarity, but differ with respect to specific data types, data formats, organizational details, and other applications for specific matter.

Figure 1:
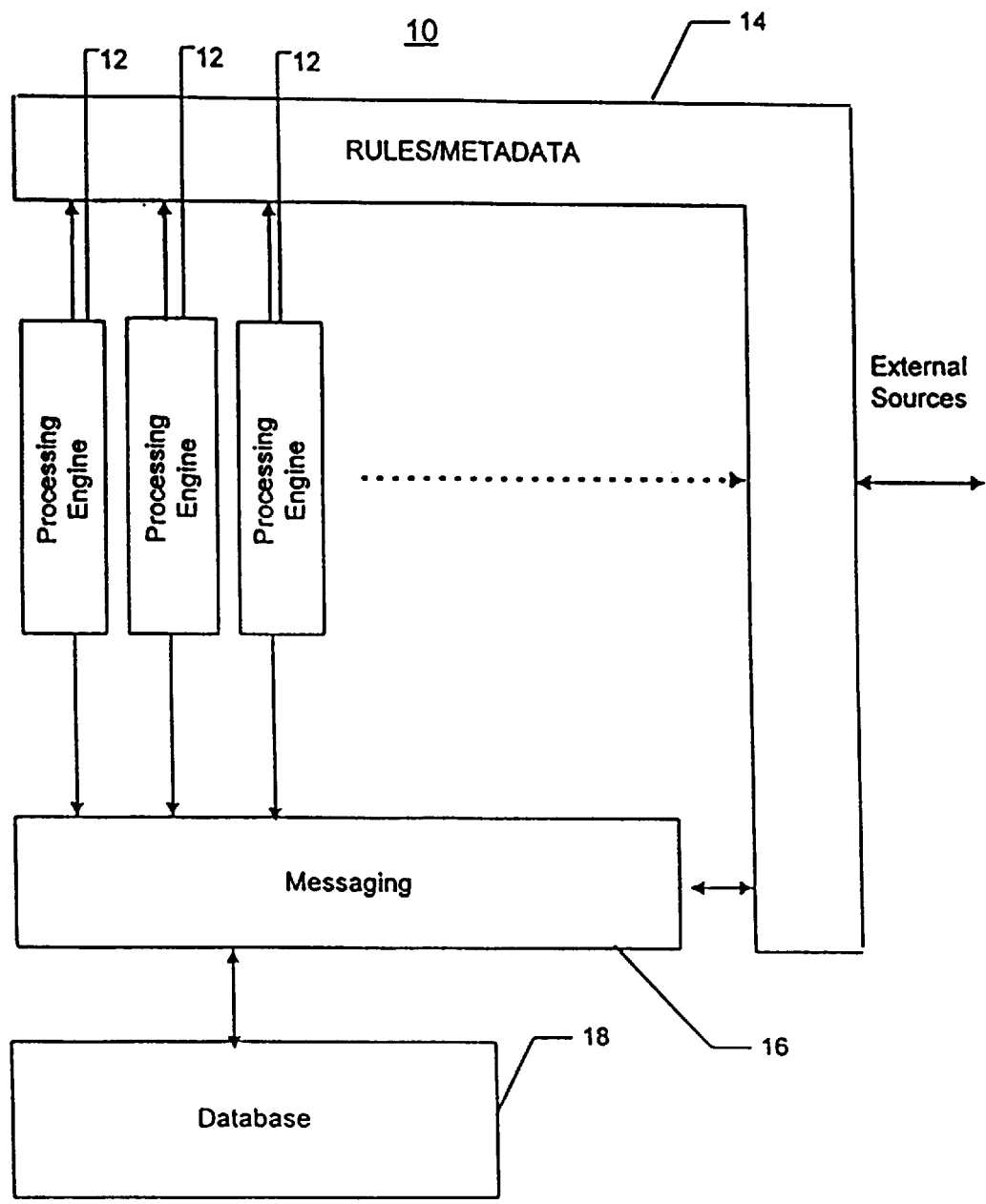
FIG. 1 is a diagram for the computational architecture.

FIG. 1 illustrates a computational framework or architecture 10 for providing the type of processing described above. This architecture allows certain generic elements or processing engines to be used to support an environment in which a variety of different computations are performed. An important advantage of the illustrated architecture is that virtually any such business environment can be supported. As a result, development risks are minimized and the time required to develop and deploy a customized system is reduced. In addition, specific applications can be tailored to the needs of a specific company and its industry rather than requiring the company to conform to or settle for an application based on a predefined business model.

The illustrated architecture may be understood as including three components: generic functional elements or engines 12, a rules/metadata engine 14, and a messaging system 16. Information to be processed in the architecture may be retrieved from data source 18 or other external services. Each engine 12 is an autonomous component that is focused upon the performance of a well defined function. Each engine leverages a common framework that facilities access to resources in common with all the other engines. While each engine is designed to provide a specific functionality, its implementation is generic. For example, one of the engines may be created to perform particular rating processes, like determining a charge for service usage. In terms of this component, the variable usage represents the entity being rated and is defined as a unit, where the definition of a unit is provided in a metadata model. For example if the unit of measure for specific application is defined to be a megabit per second, the metadata model is defined to be a megabit per second, the transferred per second. If in another instance, the unit to be measured is seconds of air time, the metadata model would simply be altered to redefine the unit of measure as seconds.

The rules/metadata engine 14 is used to relate the generic computational ends to an actual business or scientific function. The rules and metadata are two separate tools which allow the computational architecture disclosed in FIG. 1 to be customized for a particular application. The rules provide the guidelines for accessing and storing data, performing computations within the processing engines, as well as providing information to a system user through graphical user interfaces (GUI's). The employment of rules will be described in greater detail below. The metadata is used to describe the units of data which are processed within the engines. As was described above, this may be such items as units of measure or any other quantity or description which a customer would like to measure. These functions may be specific to a particular industry, company, division or other operating unit. The rules/metadata engine also includes a number of processing modules for administering the various functions of the system.

Finally, the messaging system 16 operates under direction of the rules/metadata engines and provides for the routing of data signals through the system. The messaging engine 16 facilitates the communication between the processing engines 12, the rules/metadata engines 14 and other applications or systems.

Figure 2:
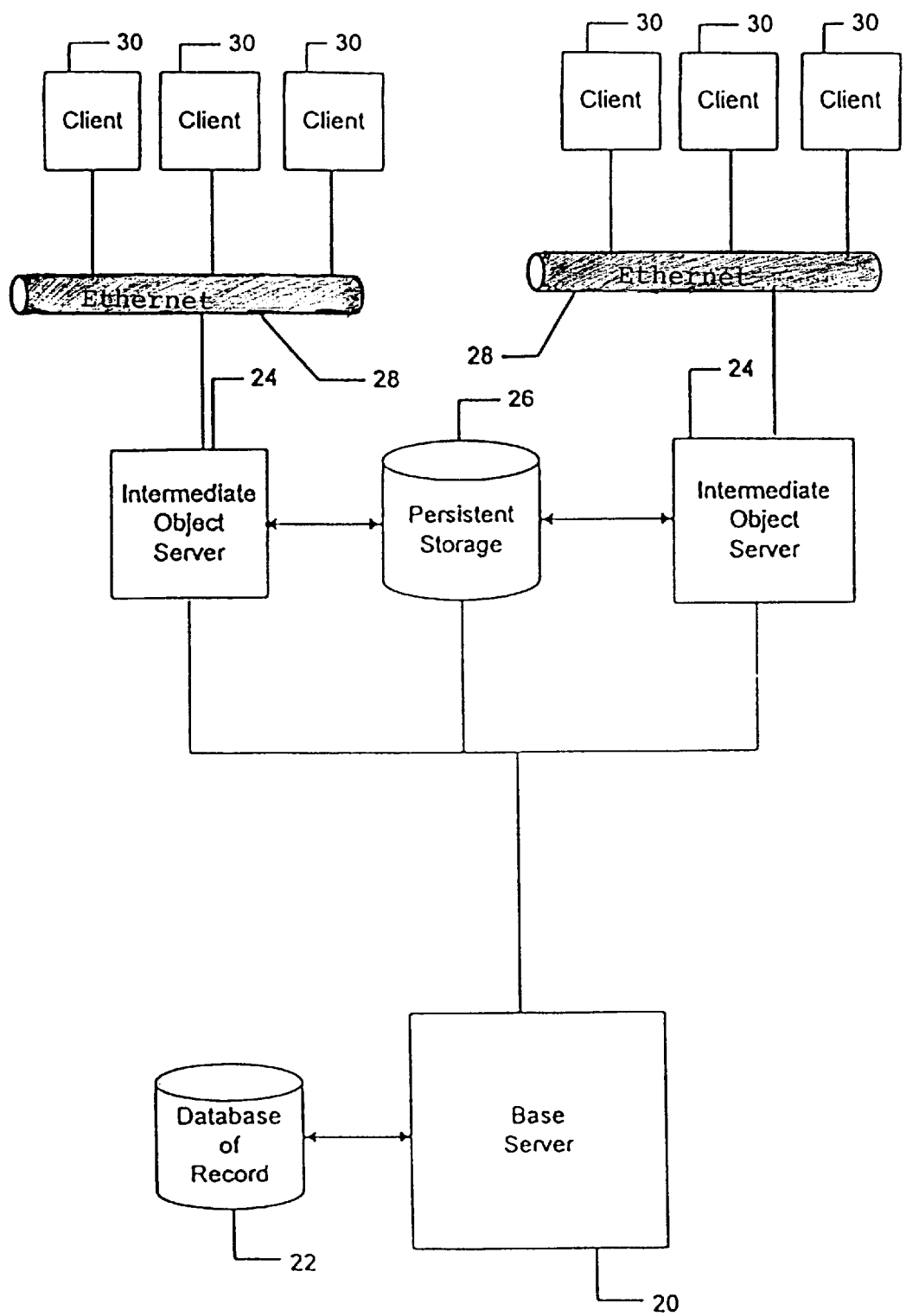
FIG. 2 is an embodiment of the computational architecture in a networked system.

Disclosed in FIG. 2 is a block diagram of a multi-tiered processing system which incorporates the computational architecture described above. The multi-tiered structure provides the functionality to perform more application specific processes at the tiers closer to the users of the system, and increasingly abstract functions are performed at a central location near the base.

At the lowest tier is a base server 20 which is connected to database of record 22. Within this server are the processing engines and a portion of the rules/metadata engine needed to perform the processing operations. This server may be of the type currently available, such as a Unix server, which is connectable to a data network and includes database search capabilities. The master database is a relational database which may be used to store a number of different types of data. This data may generally be characterized as metadata, system data and real data. Metadata, as previously noted, is the application of independent units for internal use by the processing engines. Real data refers to customer usage data and other externally defined or real world data on which calculations may be based. System data encompasses all other data stored for use by a particular program which includes client defined rules data and translation definition data. This database may be implemented using Oracle relational database software. The base server is connected to at least one application server located at a middle tier with regard to the overall system. This connection is established via a message bus.

One of the advantages of the multi-tier system is that the base server may be located in a central location and the intermediate servers located remote therefrom. Connection may be established through a local area network (LAN) or over the worldwide web.

At the intermediate tier there is at least one application object server 24 which performs a number of operations which are relevant to the location which it is serving. The operation of this server will be described in greater detail below. The application object servers are connected to a database 26 which contains information relevant to performing processing functions at that particular location.

The intermediate server may be connected to a data network, such as a local area network (LAN) through an Ethernet connection, to a number of graphical user interface (GUI) devices 30. GUI's 30 are input/output devices which allow a system user to enter application-specific data, such as rules, data and definitions, and provide graphical interfaces and outputs as desired. The interface may include a keyboard, a mouse, a monitor or similar user interface devices. The interface may also include input ports for establishing network connections, with telephony systems, external or external accounting systems, or other sources of real data. The output devices may also be included for printing customer invoices or the like.

Apparatus may also be provided for electronic transmission of invoices or billing statements to multiple customers via the worldwide web or other public or private network as may be desired. In this regard, the network interface may include interface hardware such as dedicated transmission lines, logic for formatting, data for electronic transmission and supporting Internet protocol, an encryption or other security logic for ensuring the privacy of transmitted data. Corresponding decryption or other security logic may be resident at the customer nodes 30.

In one aspect of the invention, the system may be adapted to provide customer service functions, where clients or customer representatives interact with the system through one of a number of intermediate servers 24. As a result of client or customer interaction, the intermediate server generates and captures encounter summary information that is communicated to the base server 20.

In order to operate in this manner, the data transfer between layers must be performed according to a predetermined scheme. This data synchronization scheme includes the functionality to store a subset of information at a tier closer to the system user. The system must also ensure that the information is synchronized horizontally across multiple databases. The system supports these requirements and ensures the integrity of the data throughout the system. To ensure data integrity, all database updates will be made to the central database of record 22. Data synchronization involves two types of data: dynamic and semi-static. Dynamic data refers to data that changes frequently as a result of input at the client node or business rules. Semi-static data refers to data that seldom changes, and when it does it is usually scheduled.

The above is known as an adaptive tier data synchronization scheme, and is manifested by two components. The first of these is the rule-based message service described above. Within any adaptive-tier architecture, business objects may reside within any tier, and will require the ability to communicate with objects resident within any of the other tiers. Since the routing of messages by the message service is dictated by an easily configurable ruleset, these services give the system architect the flexibility to freely map the other components to any of the architectural tiers. In support of any allocation of system components to the tiers of an adaptive-tier architecture, inter-components communication may be accommodated through simple manipulation of the message routing rules.

The second component of the adaptive tier support made available by the system is a set of data staging services. These services provide the capability to cache high-interest, high-demand data within the intermediate tiers of an adaptive-tier architecture. This cached data may be used to populate the initial screens required at the client node. In addition, the data staging services also provide the capability to intelligently "back-fill" from the base tier the data required at the client node that was not cached within the intermediate tiers. On behalf of a given user encounter, the order in which data is residing within the intermediate tiers is targeted by this backfilling process and may be driven by such things as the current state of the service provider's relationship with that particular customer at the time of the encounter. The inferential back-filling mechanism is effectively used to anticipate the encounter-specific requirements for non-cached data, such that base tier data required to support the encounter is actually present within the intermediate tier by the time that the data is called for at the client node.

Rules are provided related to the likelihood that certain data will be requested during an encounter. The rules employed to backfill the data may be based on predetermined probabilities or may be adaptive in nature. The operation of the system may be continually monitored and based on past performance, updated probabilities may be generated relating to the type of data which will be used to backfill during a particular encounter.

Figure 3:
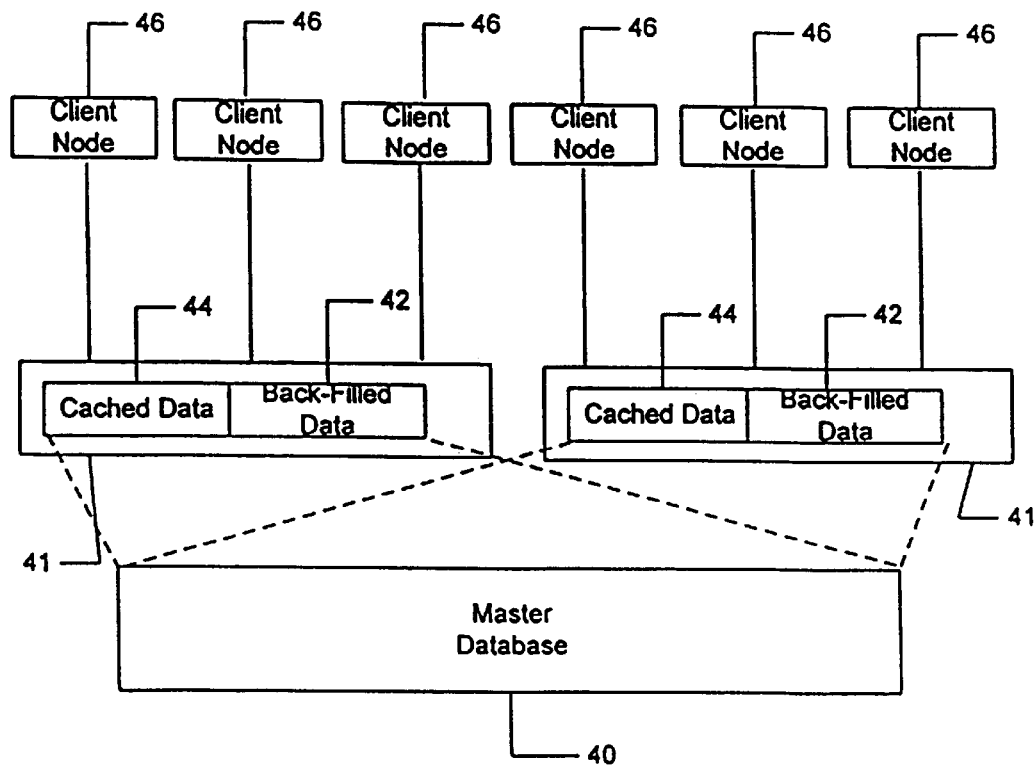
FIG. 3 is a block diagram disclosing features of adaptive tier support.

Disclosed in FIG. 3 is a diagram which provides an illustration of the adaptive tier system for providing data.

The master database 40 contains all necessary data which will be retrieved for an encounter with a user. Once an encounter has been begun, relevant information for that user is provided via the communications system to the intermediate tier 41 and stored in cached data 44. This information is then accessible at the client node 46. If an encounter is initiated with a user for whom an open commitment exists, data staging services could immediately commence the back-filling process for transitioning the appropriate detailed commitment status data from the base tier to the intermediate tier for storage in the backfilled data 42, based on the likelihood that this data will soon be requested at the client node 46.

In order to implement a multitiered system as described above, and yet provide the necessary performance, an object oriented system is disclosed which employs various objects which process data at different levels of abstraction between the client node and the base tier. More specifically, domain, business, and presentation objects facilitate the abstraction of data model relationships from the user interfaces or various engines.

Figure 4:
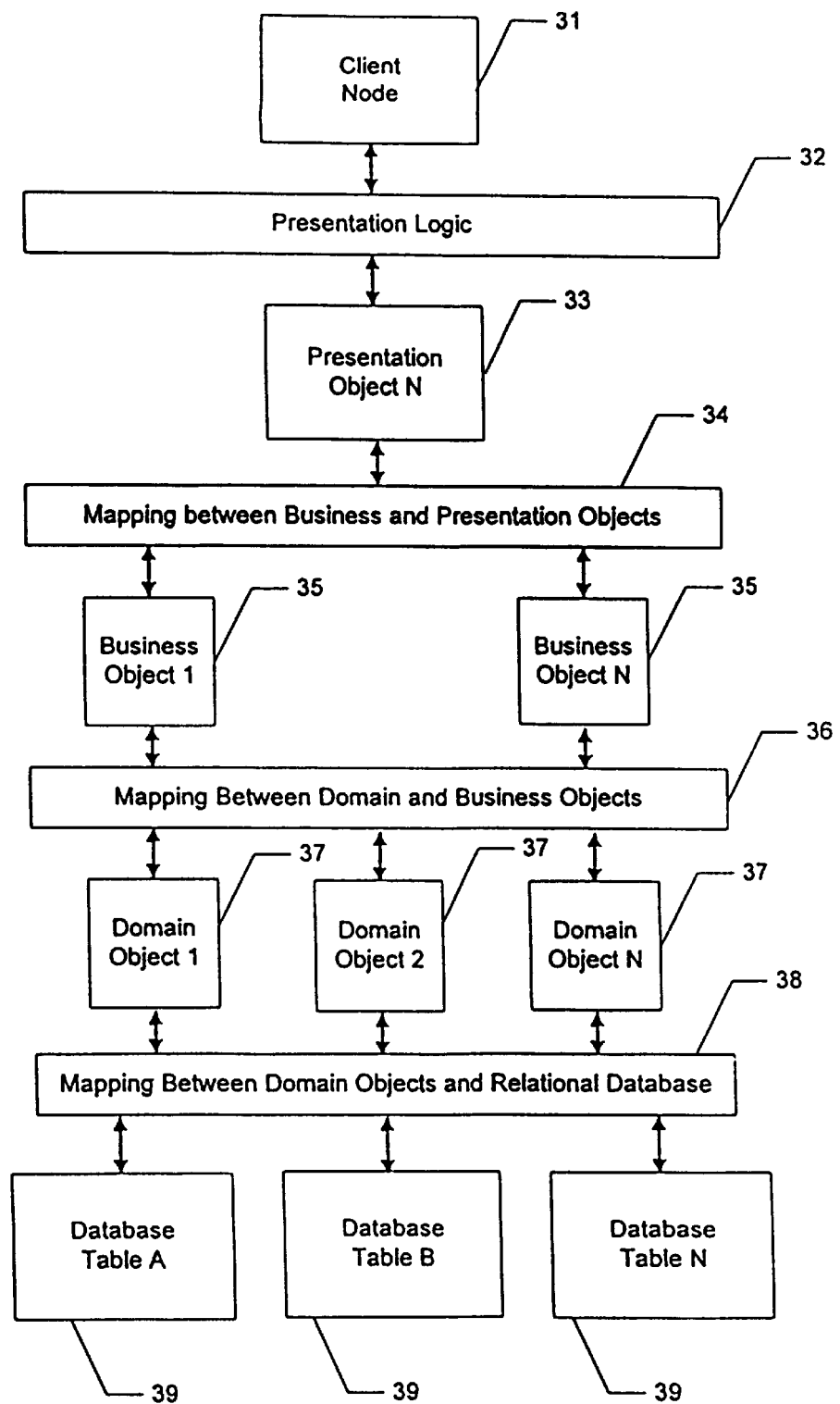
FIG. 4 is a block diagram which provides an overview of a object oriented multitier system.

Disclosed in FIG. 4 is a high level view of a multitiered object oriented system. This is an architecture which divides the presentation objects (user interface), business objects, and domain objects into three distinct layers. Each layer or tier may reside on a different virtual machine. The presentation object layer 33 provides for communication with the client node 31 as well as with the business object layer. Interface with the client node 31 is provided through presentation logic 32. Object mapping 34 is provided between the presentation objects 33 and the business objects 35.

The business object layer includes the business objects 35 and provides for communications to the data access layer, or domain objects 37. The business objects contain the key abstracted business logic supported by the particular implementation of the system. Contained within these objects may be the metadata and rules necessary to drive the processing engines. Mapping 36 is also provided between the business objects 35 and the domain objects 37.

The domain objects 37 correspond closely to a data model entity or an entity obtained through an API from an external source. The domain objects facilitate the location of data required by the presentation and business objects. Mapping 38 is provided or locating information in the various tables 39 of a relational database.

Also included in FIG. 4 is a simplified diagram of the mapping which may occur between objects in the system. As mentioned above, the presentation objects control the types information presented and are specific to a particular client node. If for example, a request is made at a client node to provide current charges for a particular customer, at least one presentation object 33 is employed to provide this information. Mapping may be provided to a number of business objects (1–N) 35 in order perform the operations necessary to generate the information. Through use of the rules and metadata the business objects direct the operation of the processing engines.

In order to locate the generic units employed by the processing engines in performing the functions, further mapping is provided between the business objects and the domain objects. The domain objects, as part of a number of functions, provide for the location and retrieval of the necessary generic units from the appropriate tables in the database. Mapping is provided between the domain objects (1–N) to the tables in the database which include the information required by the presentation and business objects.

Figure 5:
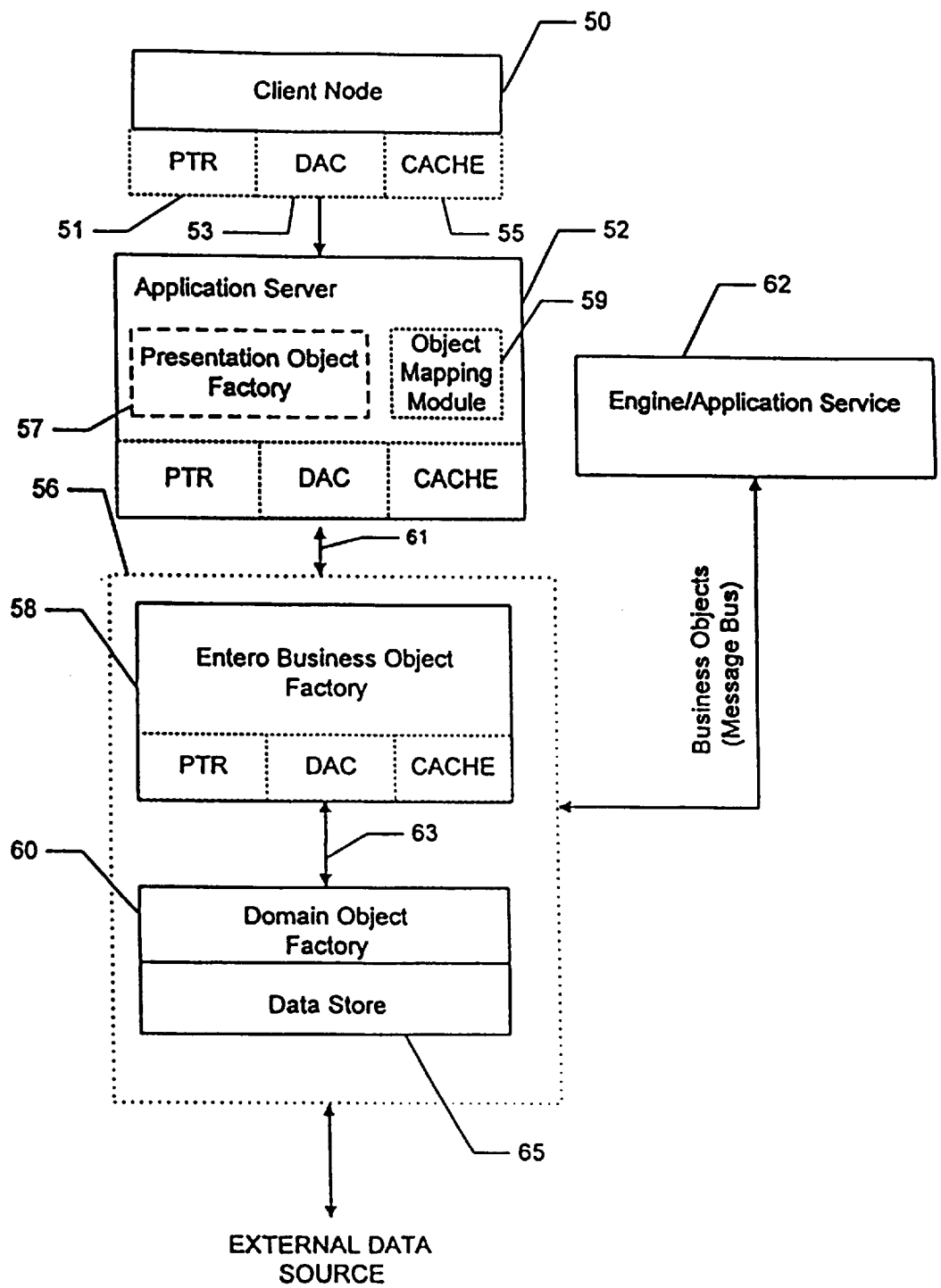
FIG. 5 is a detailed block diagram which shows in particular the configurations of the servers and custom interface in a tiered configuration.

Disclosed in FIG. 5 is a system diagram for the multitiered system described herein. The diagram has been simplified for explanation purposes to disclose a single communications path between the base tier and a client node. As was disclosed above, a base server may be in connection with a number of intermediate servers which in turn may be in connection with a number of client nodes. Each client node includes the functionality, as described above, for displaying and receiving data input to the system by system user. The client node 50 includes a presentation transaction controller (PTR)51 and cache 55 which provides for the temporary local storage of data received from the application server 52. The PTR 51 is a specialized object that is responsible for managing objects within its context and their state. In addition, the PTR facilitates the treatment of a collection of objects. These objects, as a collection, may be used to satisfy some business logic. As a collection, changes to the objects may be committed as a group or reverted as a group. The functions performed by the transaction controller include instantiation of the controller, object management, transaction management and object locking.

The client node may further include a discretionary access control (DAC) device 53. The DAC 53 provides a filter within the translation controller on the registered object to control their instantiation, deletion, access, update, and behavior. These filters may be imposed through configurations based upon the criterion of the user.

In connection with the client node is the intermediate application server 52 which includes a presentation object factory 57. The presentation object factory 57 provides the application programing interface (API) for application specific objects types. This factory contains knowledge which provides the capability to instantiate specific types of objects. A presentation object corresponds to one or more business objects that are highly specific to a client's implementation. These objects are focused toward supporting user interfaces, report writers, etc. The business logic utilizing the presentation objects is maintained within the supporting business objects. These objects may change from deployment to deployment. In connection with the presentation object factory is the object mapping module 59 which provides mapping for the presentation objects to business and domain objects in the object server 56. As with the client node, the application server 52 includes presentation transaction controller, DAC and data cache.

A line of communication is established between the application server 52 and the object server 56 through the message bus 61. Included in the object server, is the business object factory 58. The business object factory may provide the API necessary to create business objects. The object factory knows how to perform these operations using a collection of the domain objects as a basis. The mapping between domain objects and business objects is maintained within the data model. These mappings include both attributes and relationships. Having these mappings defined within the database, facilitates the ability to configure the system from deployment to deployment. These objects inherently derive their behavior from its data and supporting data services. Similar to the domain objects, the business objects are not expected to change from deployment to deployment. The business object factory 58 also includes presentation transaction controller, DAC and data cache.

Via the message bus 63, the business object factory is in connection with the domain object factory 60. The domain object corresponds closely to a data model entity or an entity obtained through an API from an external source. Domain objects do not necessarily have any business behavior. They simply know how to create, read and delete themselves from the data store. The domain objects facilitate the object-to-relational mapping to the main data store 65. The domain objects are not expected to change from deployment to deployment.

In connection with the domain object factory, is the main data store 65. This data source may be a database of a record or an application programming interfaces to an external data source. In either case, changes to the database of record, external data sources or their interfaces, are confined to the object server and abstracted from the rest of the system components. The master database includes the stored domain objects which are accessible via a relational database.

In connection with the object server, or contained within, is the engine/application service 62 which includes a portion of the computational architecture described above. Within the service, the processing engines perform the individual functions employing the objects (which include rules/metadata) received from the business object factory.

Referring again to the architecture disclosed FIG. 1, the functions performed by the rule/metadata engine 14 with regards to the processing engines are spread across a number of the tiers disclosed in the system of FIG. 5. Included in the rules/metadata engine are a number of processing modules which direct operations of the system. These modules include system manager 66, rules service manager 67, event manager 68, and data service 69. These services provide a common framework for building applications as well as providing methods for the applications to interact and to communicate status to a central location. Each of these modules will be discussed in detail below.

Figure 6:
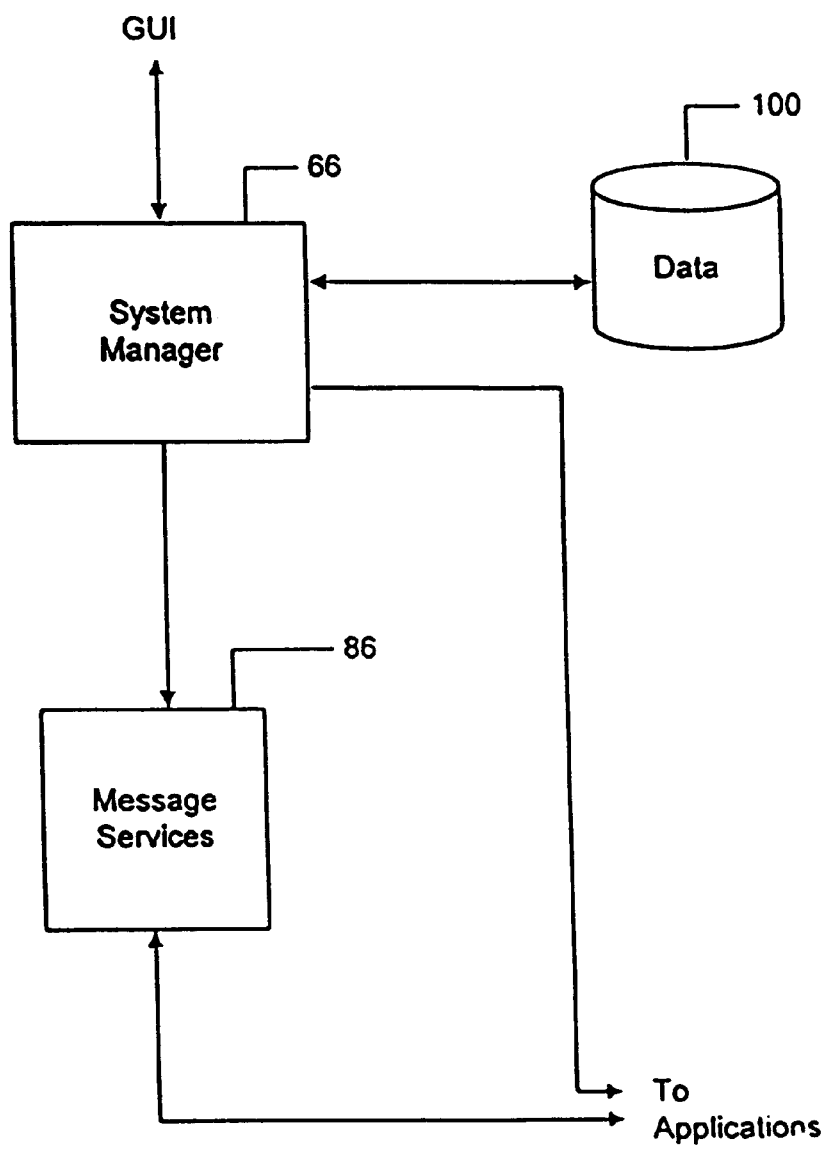
FIG. 6 is a block diagram describing the operation of the system manager.

A system diagram showing lines of communication to and from the system manager 66 is shown in detail in FIG. 6. The system manager 66 is a specialized application within the architecture which provides administrative control to other applications. The applications represent any of the engines in the engine unit which receive and transmit signals to the system manager 66, or other processing modules in the rules/metadata engine. Memory 100 contains a list of registered engines maintained by the system manager. The system manager updates this collection based on user change requests. The system manager directs other system modules, and is responsible for starting and stopping applications. Although many of the applications may be developed to run continuously, the system manager must initially start these applications or may need to restart them if an anomaly occurs. The system manager may also stop an application in situations such as when an application upgrade is required.

Finally, the system manager monitors an application through a keep-alive mechanism via the messaging service 86, which means that an application, through its normal communication of events, informs the system manager of its operational state. If the application is quiet for a specified amount of time, the system manager performs a poll of the application requiring a response. If the application does not respond, the system manager may stop the application and restarts it. All of these functions may be monitored or manually controlled through the GUI.

Figure 7:
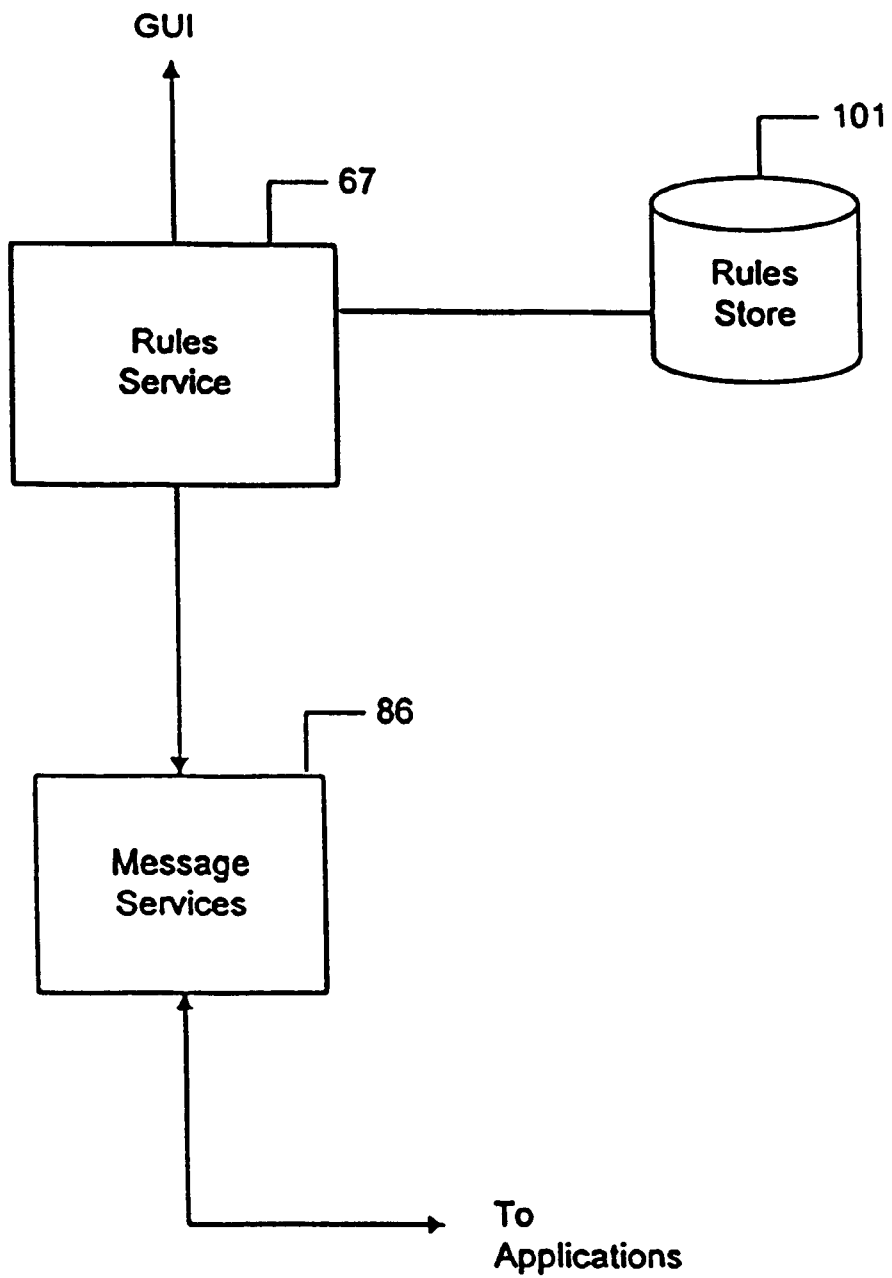
FIG. 7 is a block diagram describing the operation of the rules service.

The rules service 67 disclosed in FIG. 7 provides a mechanism for centralized management of system behavior, specific application behavior, data interpretation, data routing between applications, as well as for providing rules to the overall system. In addition, the rules manager functions as a gateway to assist the engines in their evaluation of the rule. The rules service stores a list of registered rules. These rules form the initial list of rules maintained by the rules service 101. The rules service updates this collection based on user change requests and provides this information to the various applications which employ the rules. The rules are delivered to the various application through message service 86.

The messaging service 86 which has been referred to in FIGS. 6–9 provides the mechanism for transporting message objects between applications. These objects have attributes such as age, priority, transport type (e.g., publish/subscribe, peer to peer), transport protocol, and transport security based on object type. These attributes allow routing to be established based on these attributes. The actual number of applications varies but the interaction of additional applications is the same as those represented herein. An application may also have multiple connections through the messaging service. Also there may be multiple message object services to help load balancing. In this manner, an application may be connected to multiple message services or a message type may traverse several message services before being delivered.

Figure 8:
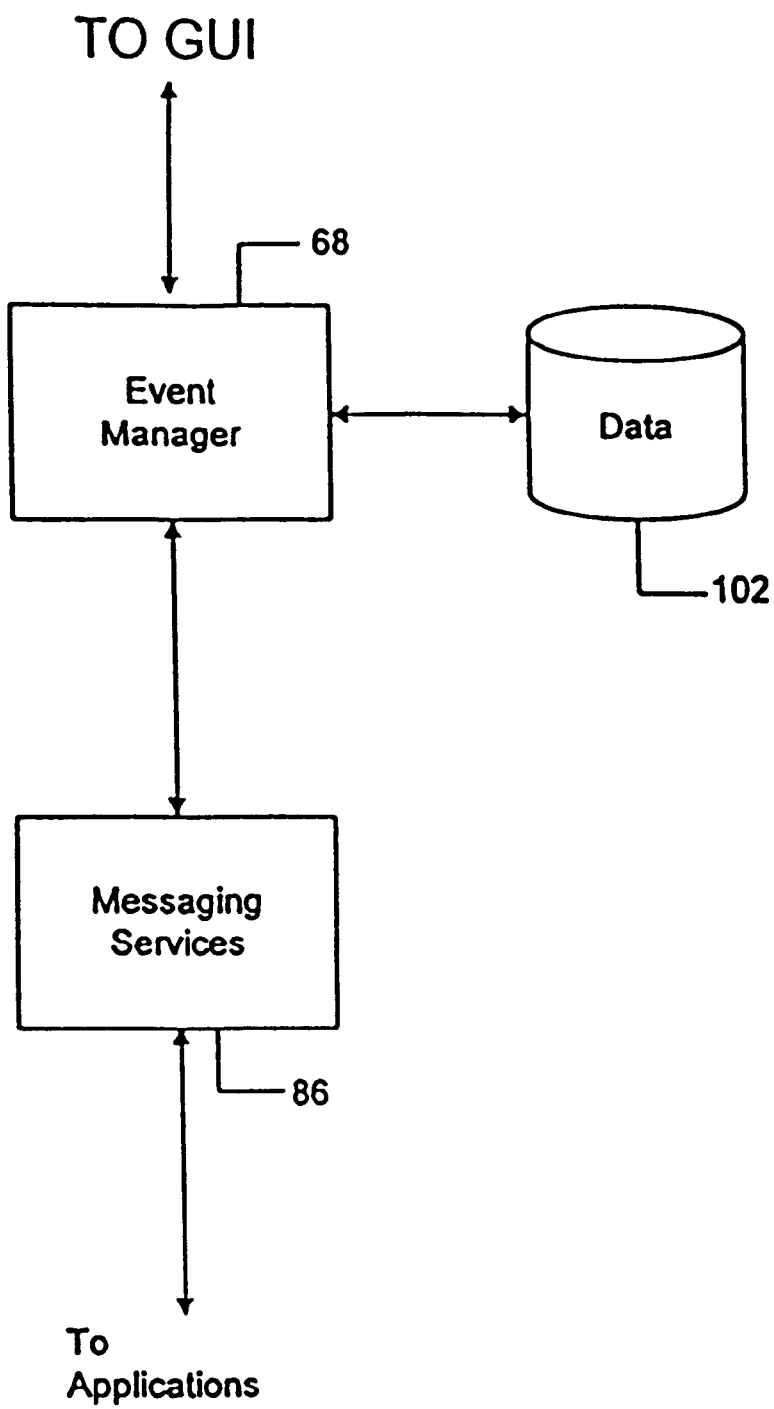
FIG. 8 is a block diagram describing the operation of the event manager.

Disclosed in FIG. 8 is a system diagram for event manager 68. The event manager 68 provides the mechanism for managing complex events across the entire system. These events generally require state retention and may be combined with events from other system components. In addition, the highly time sensitive events and events that may be executed periodically outside of a specific event, are managed within this service. The event manager is a rules engine designed to be configured for specific complex or time critical events. Contained in storage 102 are the list of events maintained by the event manager. The event manager updates this collection based on user change requests. The system user may, through a client node, add, delete, modify or display particular events. The event manager coordinates the occurrence of events to the various applications through message service 86.

Figure 9:
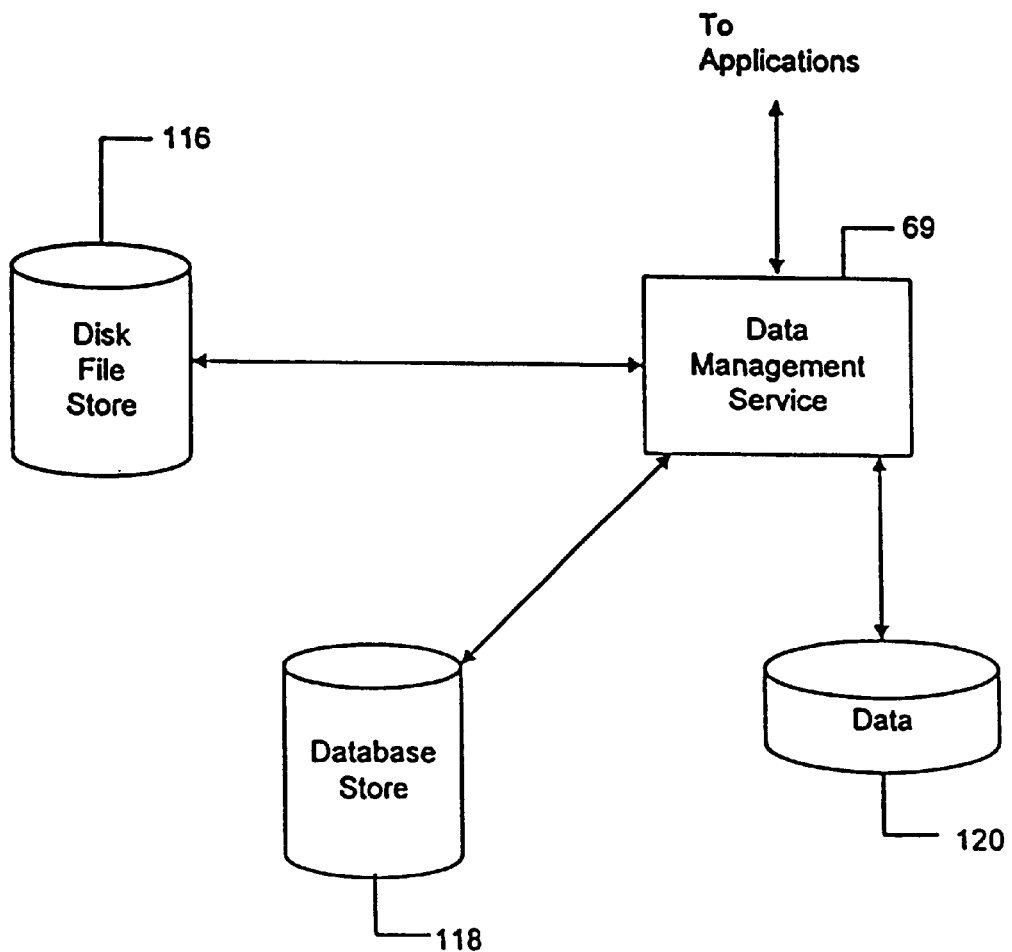
FIG. 9 is a block diagram describing the operation of data management service.

Disclosed in FIG. 9 is a system diagram showing the lines of communication to and from the data management service 69. The data management service provides the mechanism for converting between non-object data to an object which one of the applications may use. These non-objects may be a disk file, a database relation, or other messages. In these situations, the service provides the mechanism to open, read from, and close the connection. The data management service 69 provides access to files on disk file storage 116, or the retrieval of other information from database 118. Further, object mapping data can be retrieved from other data sources which are represented by database 120.

In one embodiment of the invention, the architecture and related functionality described herein encompass a process and system for developing bill and customer service related applications; a process and system for managing a billing operation; a process system for adapting functional bill and customer service related modules from one billing environment to another; a process and system for extracting information from an externally defined data model for processing by generic functional billing module; a process and system for operating a billing program according to company-specified rules; a process and system for providing a billing output in terms of specified billing parameters based on processing by generic functional billing and customer service modules; a process and system for accessing and providing information as part of a customer service function, and related software and other logic.

For this embodiment, the architecture described above is a system for developing, customizing and operating a number of billing programs for supporting varied billing environments. Such billing programs share certain functional similarities. For example, billing programs may involve determining a quantitative aspect of customer usage (e.g., a telephone call duration), determining a qualitative aspect of customer usage (e.g., a rating zone of the calling telephone), determining a rate applicable to the customer usage (e.g., based on time of call, calling plan) and determining a cost associated with the customer usage (e.g., based on duration of the call, rating zone, and applicable rate). However, many specifics will vary from application to application. For example, billing programs may vary due to the nature of the externally defined data (e.g., from telephony systems, accounting systems) and client based rules (e.g., calling plans, security requirements).

Further, the billing system embodiment is set forth in the context of a billing and customer service program with particular examples relating to a telecommunications network. It will be appreciated, however, that various aspects of the invention have broader application as noted above, and the following description is not intended to limit the scope of the appended claims.

Figure 10:
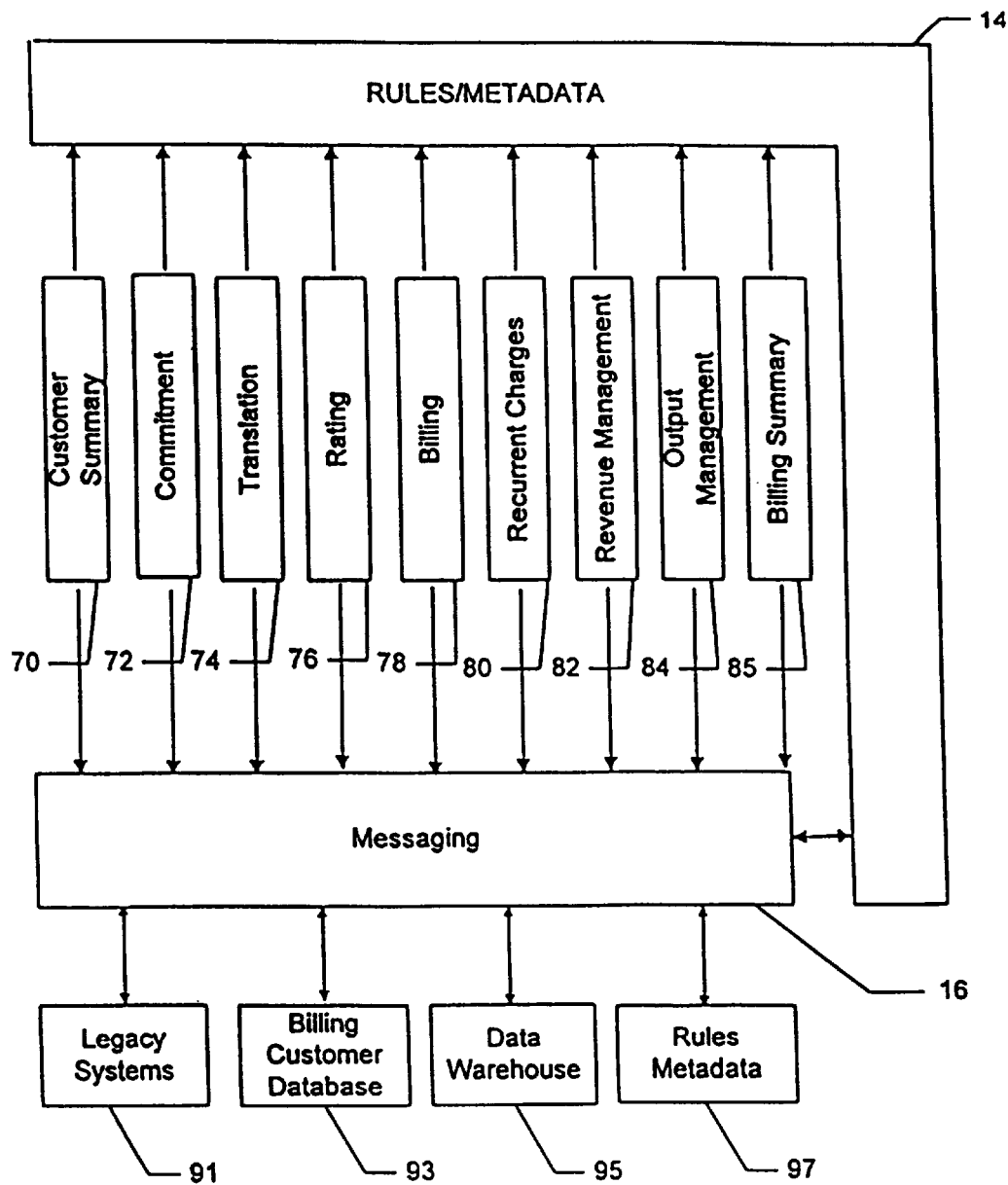
FIG. 10 is a block diagram of the computational architecture in the billing system embodiment.

Disclosed in FIG. 10 is an embodiment of the processing architecture as it would relate to a billing system. Shown in particular are the rules/metadata engine 14 which perform various management functions for the billing and customer relations system, the processing engines for the billing system which include: a customer summary engine 70, a commitment management engine 72, a translation engine 74, a rating engine 76, a billing engine 78, a recurrent charges engine 80, a revenue management engine 82, an output management engine 84, and a billing summary engine 85, as well as messaging 16 for communications between the processing engines, the rules/metadata engine, and the various data sources which include a legacy system 91, a billing and customer care data source 93, a data warehouse 95, and the various stored rules and metadata 97. The operations of these modules in the billing system will be described in greater detail below.

FIGS. 11–18 relate to the operation of the various processing engines in the billing system computational architecture. The engines are a number of object oriented software modules that perform billing and customer service related functions by operating on generic units independent of the specific environment. That is, the internal operation of the engines does not depend on the nature of the thing being rated or billed, or the customer service provided. The engines are based on the concept that many billing and customer service related functions can be executed using a generic data model supported by rules based logic. In this regard, any billing and customer service related functions that can be executed using a generic data model may be implemented as a engine. It will therefore be appreciated that the number and functionality of the engines can be varied. The specific engines described below are therefore included by way of example only.

Figure 11:
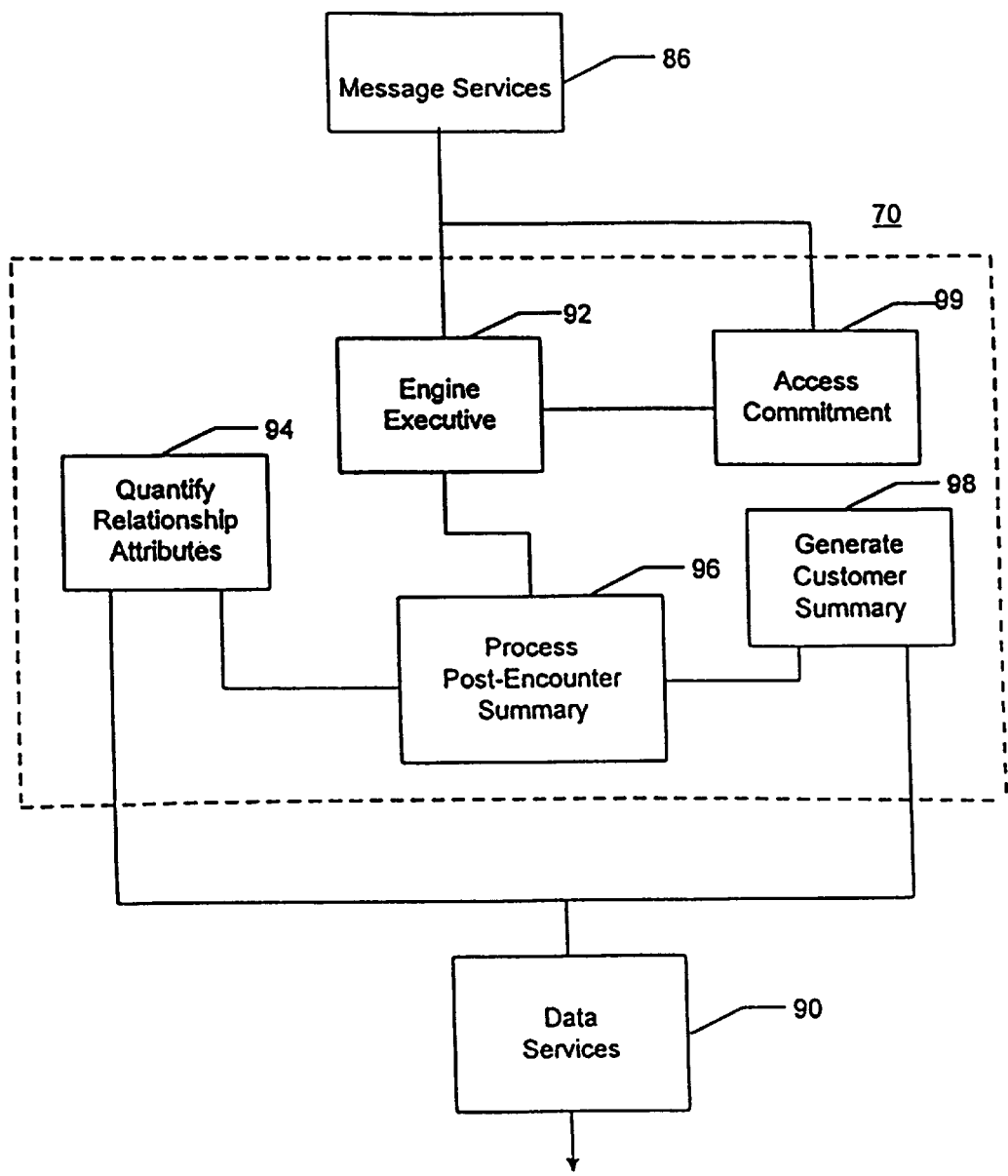
FIG. 11 is a system diagram for the customer summary engine.

Disclosed in FIG. 11 is a system diagram for the customer summary engine 70 showing, in particular, the various lines of communications to other components in the system. This customer summary engine provides the functionality for a customer service representative to quickly ascertain the nature of a customer's relationship with the service provider when in communication with that customer. This customer information may include names and addresses of people associated with the account, the customer's hardware configuration, the method of payment for the account, and a history of the customer's previous contacts with the service provider. Further information may be included about the type of relationship established between the service provider and the customer. All of this information is stored in an external database accessible via data services 90. This engine provides the functionality to ensure that the customer service representative's desk top displays all required information about a specific customer at the time a communication is established. The instructions for providing customer summary information and for transmitting the information once it has been received is done through the messaging services.

Included in the engine are a number of generic processing modules which perform primary functions. The engine executive 92 fields incoming messages from the message services 86 and oversees the flow of control signals through the functional components which comprise the engine. The engine executive will invoke the post process post-encounter summary function 96 to assess the impact that a recent customer encounter may have had on the customer summary information maintained by the system on behalf that customer. If any impact is identified, the generate customer survey function 98 will regenerate the appropriate sections of the customer summary information. In addition, if it is determined that the relationship attributes for the associated customer will potentially be affected by the encounter, the quantify relationship attributes function 94 will be invoked to make the necessary calculations. Lastly, the engine executive will employ the assessed commitment impact function 99 to determine if any outstanding commitments have been affected by customer encounter, and issue a notification to the commitment manager accordingly.

Figure 12:
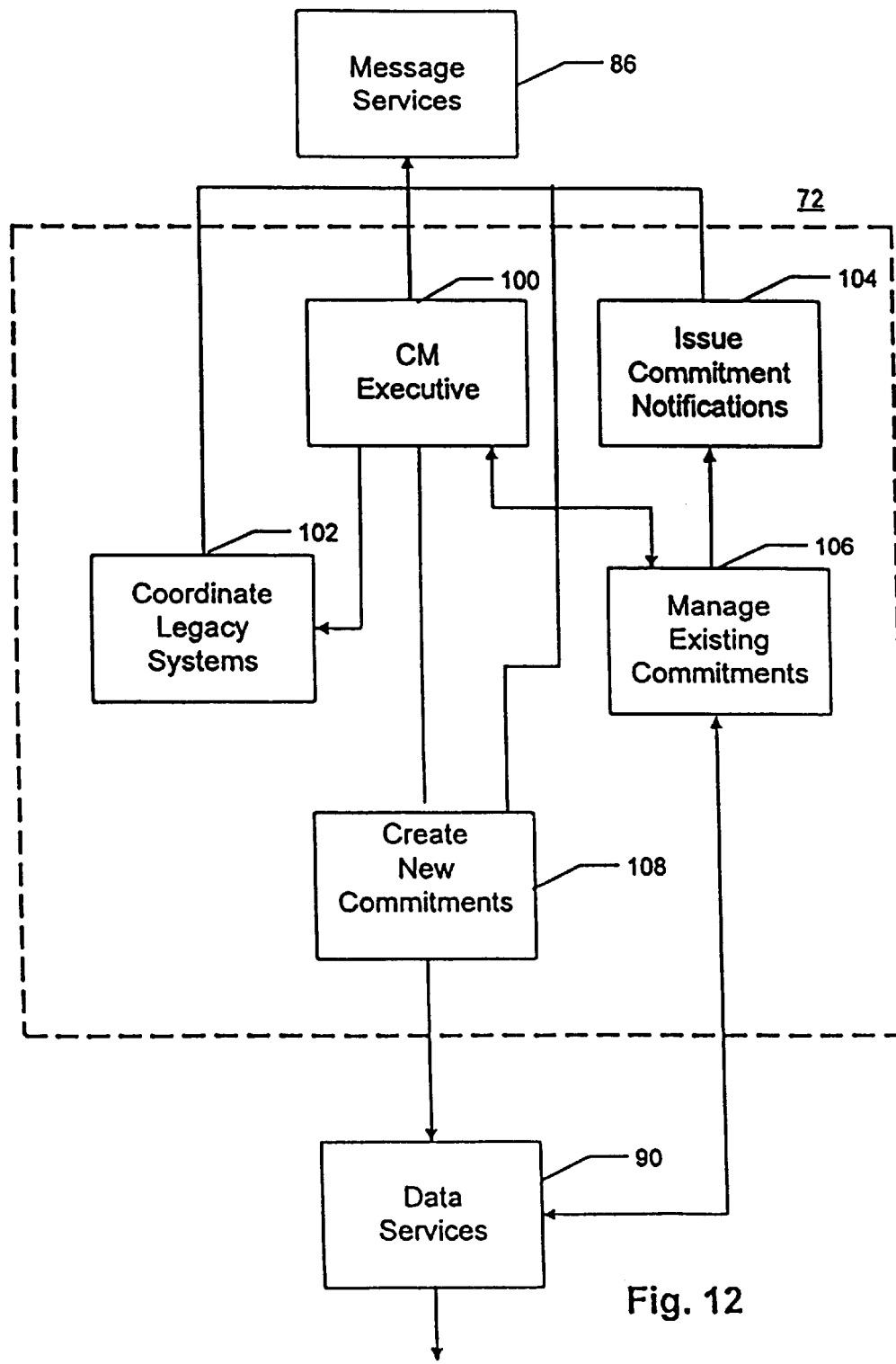
FIG. 12 is a system diagram for the commitment manager engine.

The commitment management engine 72 disclosed in FIG. 12 is designed to support the multitude of commitments that can be generated from the different customer interfaces. Commitments can include customer requests for information, problem tickets that require resolution, new or upgrade orders, system activations, and scheduling for system installations. The commitment is manifested as a request, a promise or a transaction. a request represents a statement of a commitment goal (such as the repair of a customer's equipment). A set of promises associated with that request represents those tasks that must be completed before the request can be declared complete. In response to the various actions taken on behalf of commitments in the system the commitment manager will provide the following: centralized control over the execution of requests and their associated promises, tracking of these commitments through their respective transitional states, a notification to other components of the system when any commitment is fulfilled.

Returning again to FIG. 12, connections are established between the message services 86 and the data service go from the various modules within the commitment manager. The commitment manager executive 100 fields incoming requests from message services and oversees the flow of control through the functional components comprising the commitment manager engine. For those messages related to a commitment the commitment manager engine executive will invoke the process commitment function to obtain the indicated commitment information from data services and then change the processing stipulated by the message, (e.g., check the status of the commitment, or trigger a state transition from the commitment). The issue commitment notifications module 104 is responsible for initiating any coordination with other system components as a result of change in the commitment status. Functionality is also included in the commitment manager to create new commitments 108 and manage existing commitments 106. Lastly, the coordinate legacy systems function 102 is responsible for managing any interaction with the legacy commitment management systems that may be required to support the reporting of status on a particular commitment.

Figure 13:
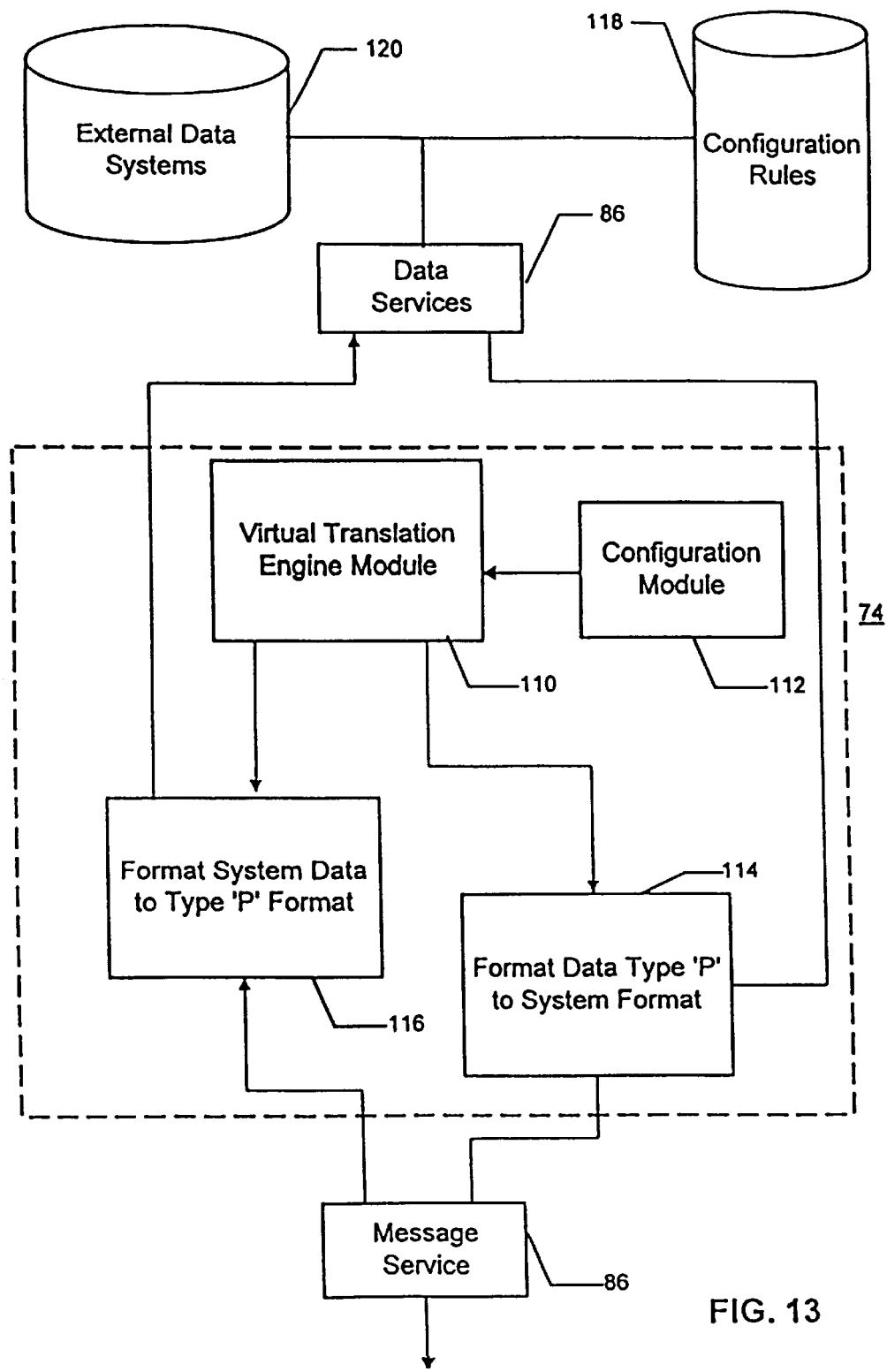
FIG. 13 is a system diagram for the translation engine.

A system diagram for the translation engine 74 is disclosed in FIG. 13. The translation engine is designed to convert complex data formats from outside sources, for example, EFT or credit card information, into standard formats to be used by the system described herein. Conversely, the translation engine can format internal system data to be sent to external sources 120. This translation function is performed by a suite of tools including a variety of conversion routines. The conversion routines are used in combination to translate data strings in an input or an output mode. For example, an external data format based on an industry protocol can be translated into a simplified data format for processing by other engines, or output data from engines can be converted into an external data format based on an industry protocol or billing parameters determined by an operating company.

This particular engine includes formatter routines, formatting rules and processing system services. The translation performed by this engine is closely tied with the rules. Configuration rules 118 can be applied through the data service 86 to initiate the translation engine that will have the sole task of formatting data going to and from a specific external data source. In these instances a translation engine becomes a data gateway for a single external data source. One translation engine may perform multiple tasks or individual engines can be applied for specific translation tasks which maximize the performance of each functional area in the system.

Referring again to FIG. 13, the translation engine 74 includes a virtual translation processing module 110 comprised of objects which provide for the creation of an engine intent on a specific purpose, such as an external data gateway. The configuration model 112 includes functionality for setting up the differences in the translation engine instances. For example, data pattern rules for format translation and functional rules may be used to govern the engine behavior in the system. The two format modules 116 and 114 are overloaded functions set by the data pattern rules from the configuration module 172. In each engine, there will be a format module to format data from the external data source to the system format, and a format module to translate data from the system format to an external data format. Both of these modules may use the same rules to format data, the main difference being that each format module will work on its own thread and will essentially be a one way gate for data.

Figure 14:
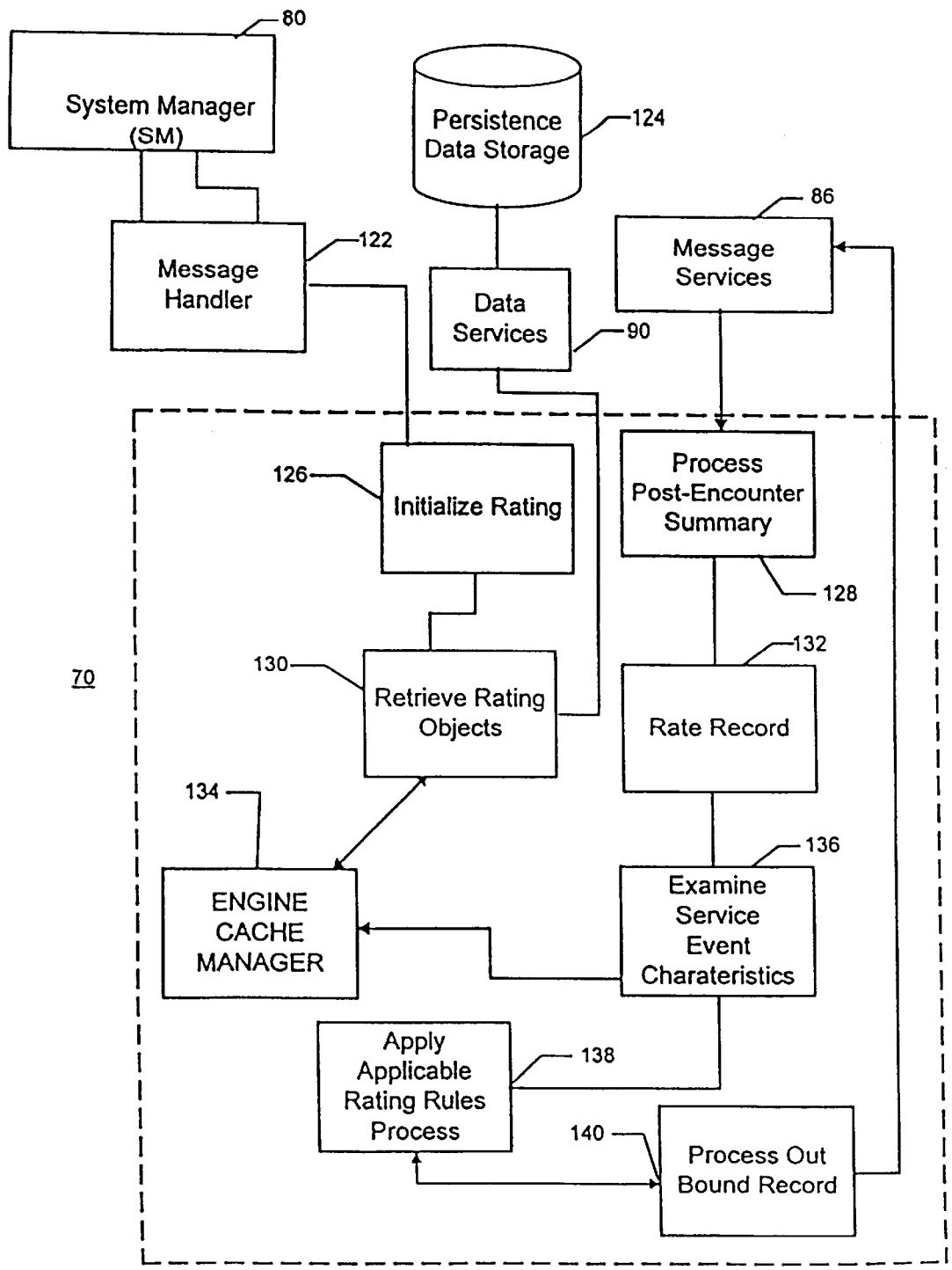
FIG. 14 is a system diagram for the rating engine.

The rating engine 76 disclosed in FIG. 14 is designed for the real time computation of charge data associated with a particular service event. The engine also associates that charge with a particular customer. The service event represents a single instance of service usage and may be a temporarily bounded event such as a connection, a one time service such as installation, or a product purchase. The rating engine communicates with the rest of the system through the messaging services 86. Information related to customers, prices, and geographic information is stored in the database 124. This system further includes a method of matching events to customers and billing plans based on a select criteria. Rate plans are applied to a unit of measure and may be varied depending on parameters which may include: day of the week, time of day, arbitrarily-defined geographic zones where the event originated and terminated, distance span, event duration, terminating device type, carrier, and direction of data transfer.

Returning again to FIG. 14, the system manager 80 through message handler 122 provides a centralized initiation and termination of the system processes. The messaging service provides for bi-directional message flow between the system manager and the rating processes. The initialized rating function 126 is responsible for initializing the rating state machines and service event queues. Once preliminary initiation tasks are performed, an engine registration request is sent to the system manager. When a termination message is received, an engine registration request is sent to the system manager.

The retrieve rating objects 130 has three primary functions. The first is executing queries against a persistent store. Second is a relation-to-object data mapping. The third is an object assembly and disassembly. The engine cache manager 134 is responsible for managing cache rating objects. It provides mechanisms for storage, retrieval, and management of objects date changes. The process service record function 128 is responsible for monitoring inbound service event queue. The rate record function 132 performs the process which is responsible for establishing single or multiple threads of execution for the remainder of the rating process. The number of threads needed to handle service event record demand can be changed dynamically.

The examine service event characteristics module 136 provides a number of different functionalities. They include determining service type, record validation services, service event record to addressable unit mapping services, addressable unit to rate plan services, normalization of daytimes, determination of service event origination and determination, and determination of service provider. The apply applicable rating rule module 138 is essential for the rating calculator. This process takes as input all applicable rating rules to determine and examine characteristics and apply the resulting charge to the service event record. Finally, the process outbound record module 140 is responsible for processing outbound service records. It provides mechanisms for handling the routing of rated service events, service record exception handling, and rejected service events.

Figure 15:
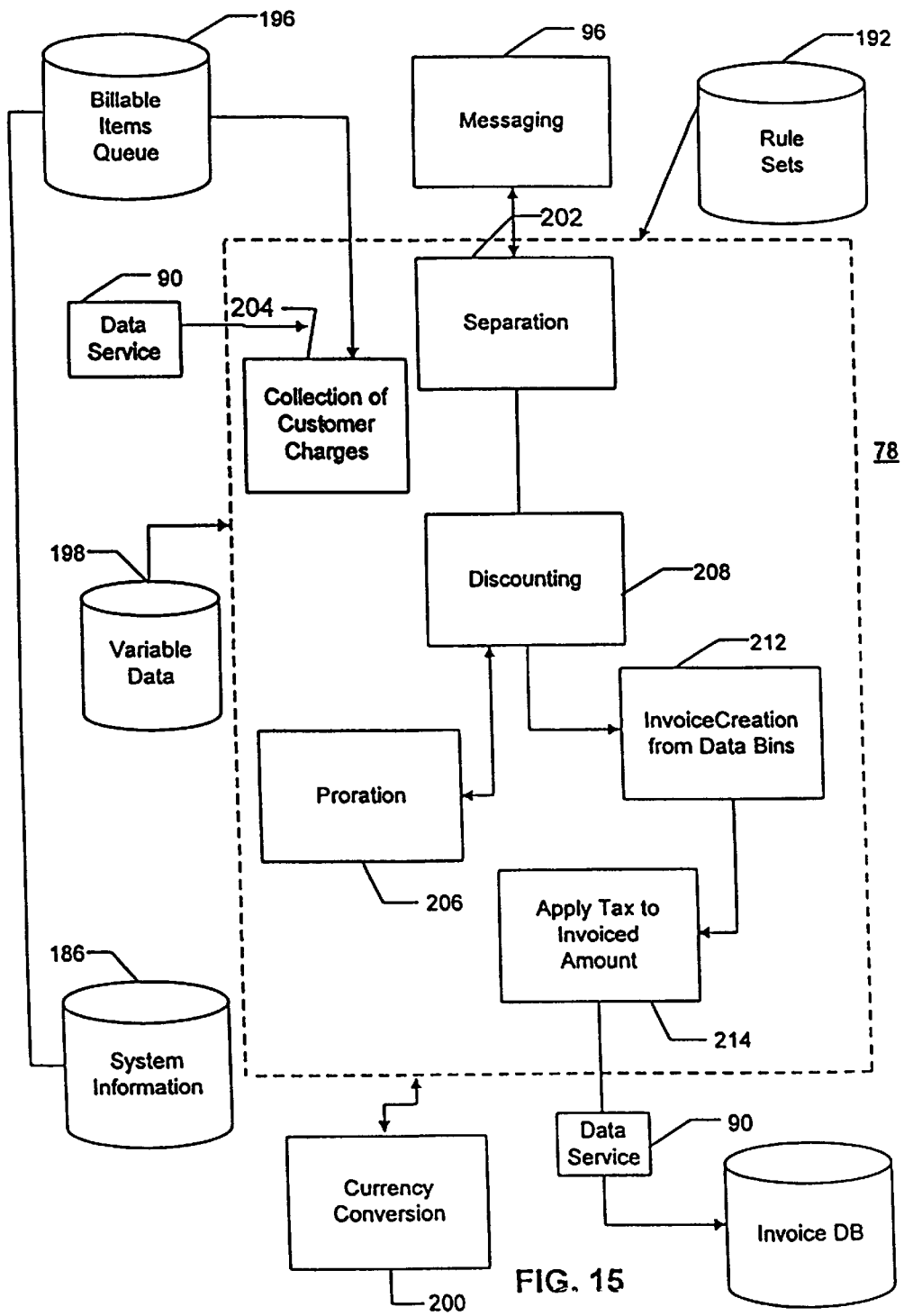
FIG. 15 is a system diagram for the billing engine.

The billing engine 78 disclosed in FIG. 15 rates service use at an aggregated level. It may be used to rate summary usage records or apply to a collection of service usage records. The managed billing features may include volume discount schedules, tiered costs based on transaction aggregation, special promotions, ability to identify and apply separation of charges between groups and individual user's companies, and ability to pay applied taxes. In order to retrieve information for these different functions a number of different databases are connected to the billing system. One database may include system information 186, another may include external data gateway information 198, and a third may include a billable items queue 196. The billing module also accesses a set of rules and invoices through other databases.

Referring again to FIG. 15, the collection of customer charges module 204 gathers customer charges for the billing engine to apply to proration module 206. Prior to the billing process, the engine begins by reading through all charges of an indicated billing cycle and grouping them by customer and charge type. Once the charges have been collected, the discounting module 208 applies a discount both before and after separation. Discounting is applied according to a series of rules provided by the rule set 192. Discounting rules module 208 may be logically combined to form more complex discounting schemes, and may be applied to individual charges or groups of charges. The separation module 202 allows subscribers to be grouped together for the purposes of billing. The groups are then arranged into an arbitrary hierarchy. More sophisticated, rule base separation may then be superimposed on this hierarchy. Different separation rules may be applied to different components of service charges. Separation rules may be logically combined to form more complex separation rules, for example, the company will pay an entire flat monthly service charge.

A rounding function may be applied at any time, such as after discounting, separation, tax calculations or current conversions. Rounding is applied according to a set of rules and they include the following types: round up, round down, and round to the nearest. The invoice generation module 212 generates an invoice after all discounting and separation has been performed and any appropriate taxes added. All line items for each invoice are then tagged with invoice number and passed on to output management 84. In the situations where currency conversion is necessary, this information is provided from currency conversion module 200.

Figure 16:
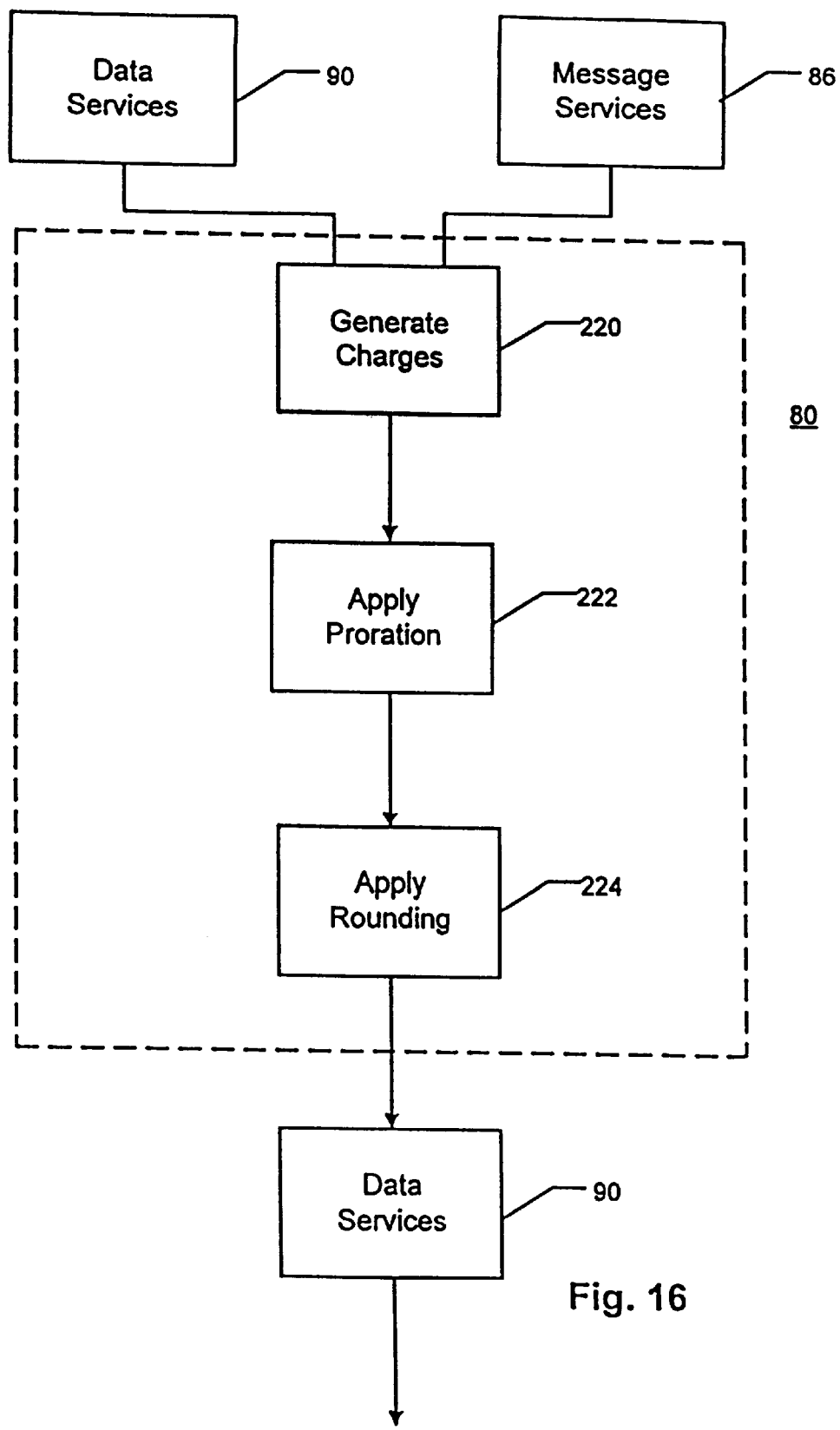
FIG. 16 is a system diagram for the recurrent charge engine.

The recurrent charges engine 80 disclosed in FIG. 16, handles the generation of charges that recur on a regular basis such as monthly service charge. The recurrent charges engine performs proration of beginning and terminating services either linearly or according to a set of flexible rules. The event manager manages the scheduling of charge generation. Once signaled by the event manager, the recurrent charges engine loads the necessary customer information, billing cycle information, and package price information, then begins generating the line item charges for each customer. As each charge is generated the recurrent charge engine schedules the next generation of the charge based upon the cycle for that charge.

Referring again to FIG. 16, through the data services 90 the recurrent charge engine has access to items such as the billable items queue, the rule sets and system information. Within the recurrent charges engine is a generate charge function 220. The recurrent charges engine relies on an external signal from the event manager to initiate charge computations. The recurrent charge engine loads necessary customer information, billing information, and package price information. Then it begins generating the line item charges. As each charge is generated the recurrent charge engine schedules the next occurrence of the charge generation. The proration function 222 may be applied in either a standard or non-standard manner as defined by the rules and this proration function is supplied to the identified charges. Also based on the rules, a rounding function 224 may round the charges up, down or to the nearest whole number as designated.

Figure 17:
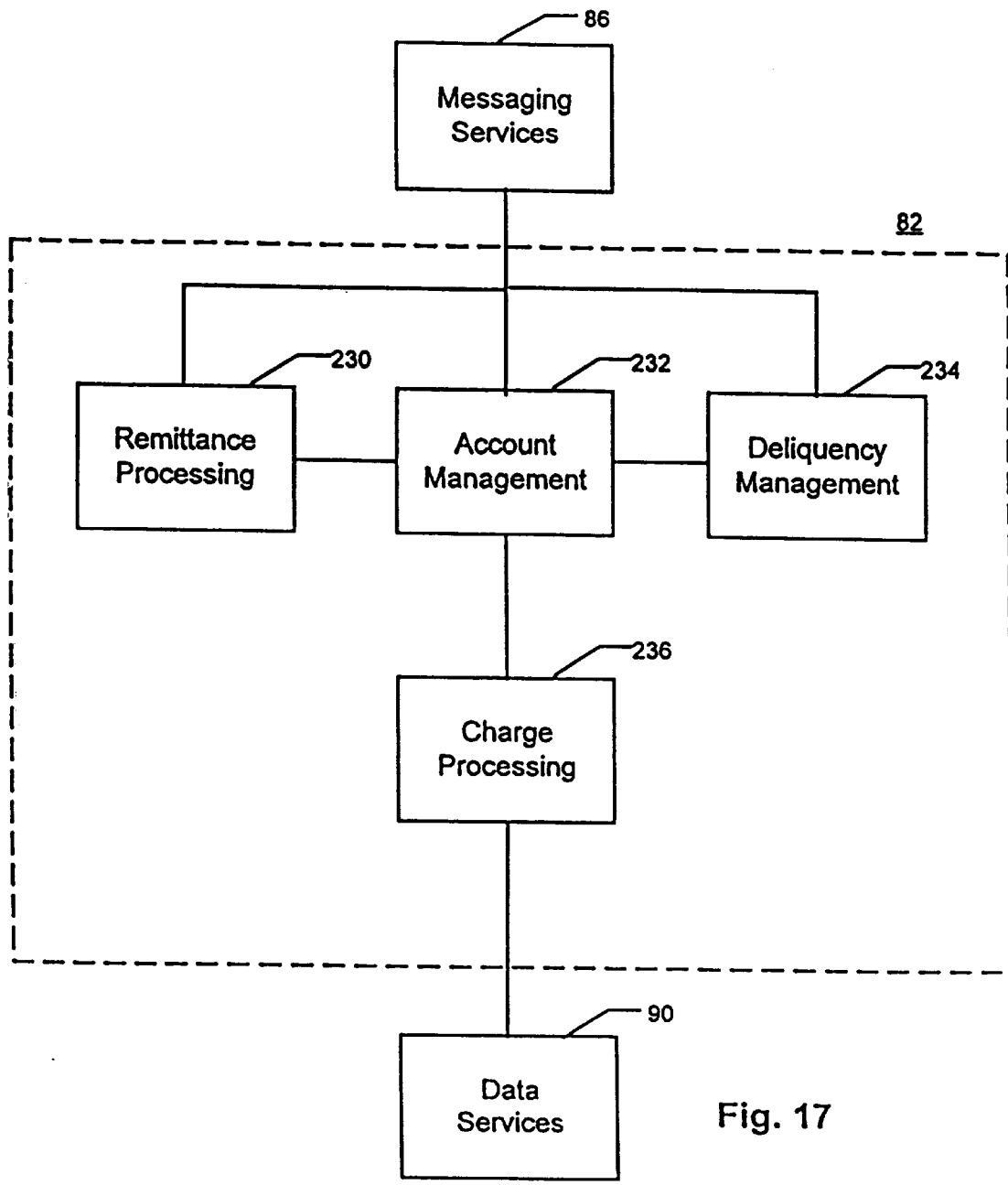
FIG. 17 is a system diagram for the revenue management engine.

Disclosed in FIG. 17 is a revenue management engine 82. The revenue management engine provides business functionality including remittance management, revenue recognition, earned and unearned income management, and delinquency in connection with distribution of revenue. The revenue management engine interfaces with the message service to exchange account information with various financial gateways and sends deactivation and activation requests to the addressability gateway. In addition it may receive remittance requests from a remittance gateway. The revenue management system also interacts with the primary data store through the data services to retrieve billing information and persistent account information, and with the data stored distribution rules prioritization of applied payment rules, account transition rules, and adjustment rules.

Referring again to FIG. 17, the delinquency and collections module 234 manages account and aging rules. Outputs can be generated for referrals to collection agencies. The account management module 232 matches payments to outstanding balances and open items. It identifies the revenue account to which to apply the remittance and allocates it accordingly. Revenue recognition module appropriately applies prepaid funds to the proper revenue account. It also correctly recognizes and manages earned and unearned income. Finally, the charge processing module 236 ensures that revenue based on a single transaction may be distributed multiple merchants.

Figure 18:
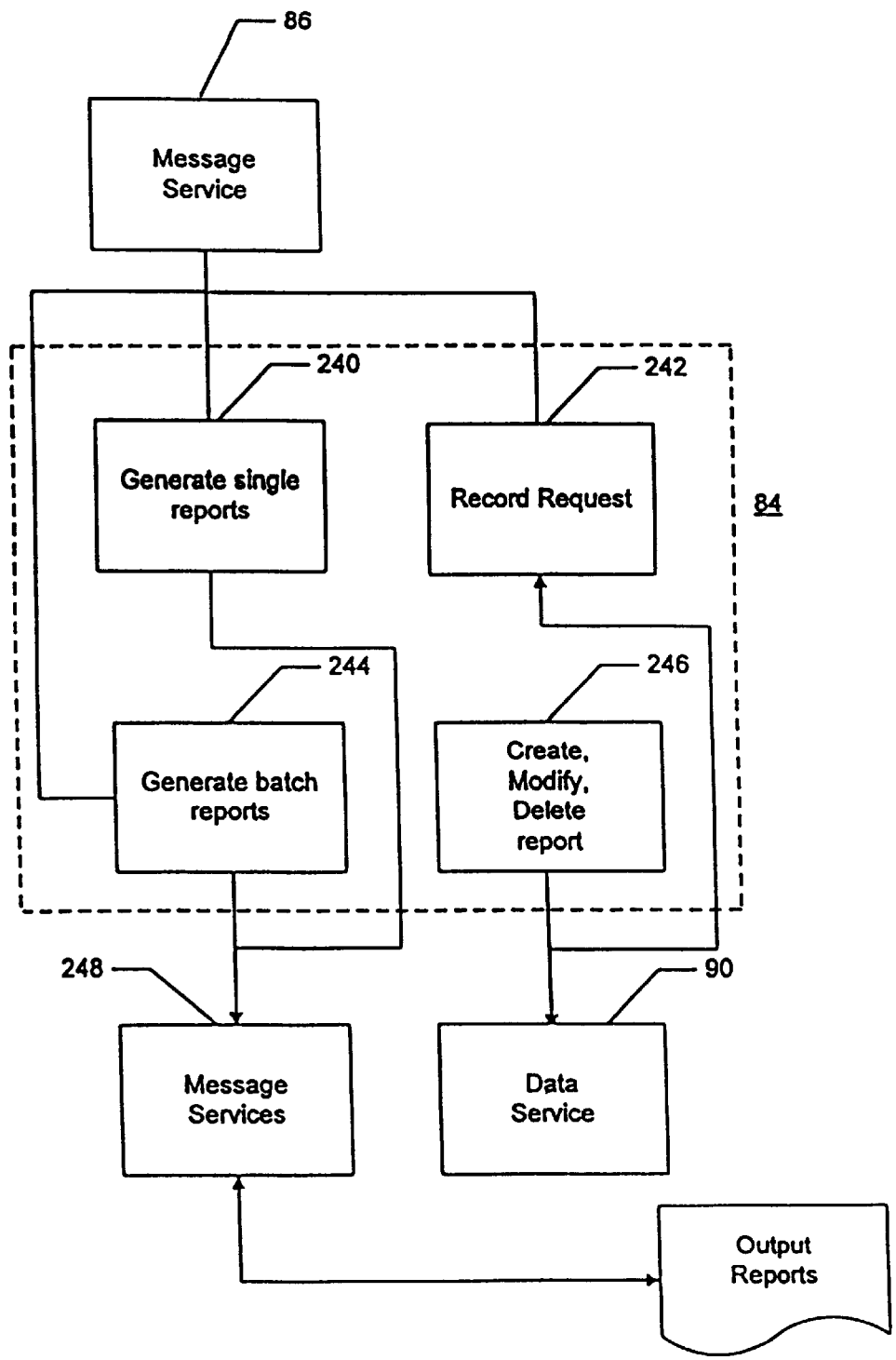
FIG. 18 is a system diagram for the output management engine.

Disclosed in FIG. 18 is a system diagram for the output management engine 84. Incorporating rules from the rules engine, via the messaging service, reports can be generated in response to requests from a number of different sources. a CSR or customer may directly through a data network initiate a command to the output management engine, to issue a single report 240 on a particular customer. A system user through the GUI may request a batch report 244 which are then output, via the data service, in a desired format. Finally the system administrator may also create, modify, and delete reports 246 which are stored in the database.

Figure 19:
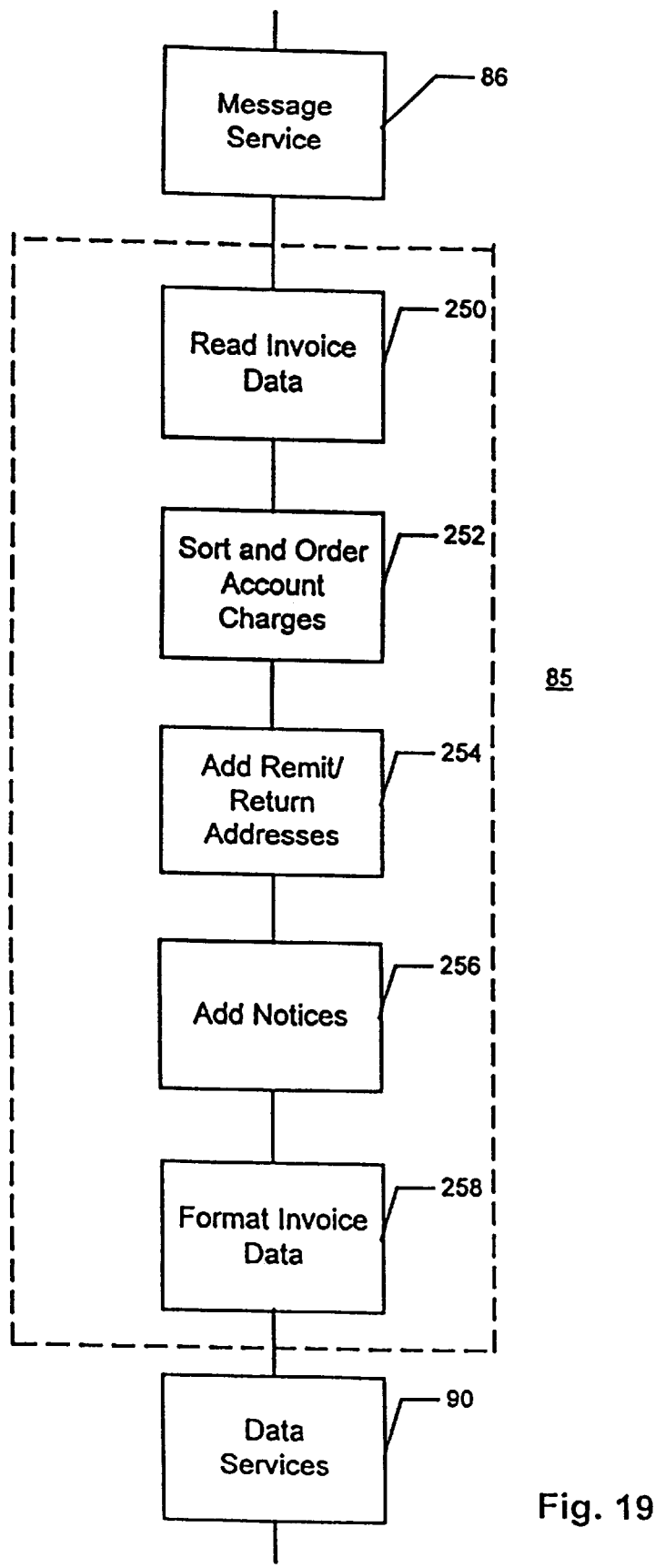
FIG. 19 is a system diagram for the billing summary engine.

The billing summary engine 85 disclosed in FIG. 19, is responsible for gathering the customer data produced by billing and revenue management and presenting it in a form that can be transformed into a customer invoice. Billing summary engine reads and sorts all account data, generates all the information needed for the invoice, and produces an output data file according to format specifications stored in one of the databases. The resulting output data file may then be forwarded to an appropriate agent for printing and mailing.

Referring again to FIG. 19, connections are established via the message services as well as the data services to various system databases. The read invoice data module 250 reads in all billing information for each account for the specified billing cycle. This includes account charges, credits, adjustments, and totals as well as the billing address for the account. The sort and order module 252 finds out which report is the invoice for each account, and loads the charge type mapping for that report. This charge type mapping is then used to order all the account charges for each invoice. The add/remit/return addresses module 254 locates the remit and return addresses for each invoice. The add notices module 256 places special notices on the invoice or includes it with the invoice. Finally, the format invoice data module 258 puts the invoice in the proper format for printing.

The foregoing description of the present invention has been presented for purposes of illustration and description. Furthermore, the description is not intended to limit the invention to the form disclosed herein. Consequently, variations and modifications commensurate with the above teachings, and the skill or knowledge of the relevant are, within the scope of the present invention. The embodiments described hereinabove are further intended to explain best modes known for practicing the invention and to enable others skilled in the art to utilize the invention in such, or other, embodiments and with various modifications required by the particular applications or uses of the present invention. It is intended that the appended claims be construed to include alternative embodiments to the extent permitted by the prior art.

What is claimed is:

1. An apparatus comprising:
    a central server located at a base tier to provide services for the system;
    a database located at the base tier connected to the central server,
    at least one application server to perform functions relevant to the location it is serving, the application server being located at an intermediate tier connected to the central server;
    client nodes through that system users may enter application specific data, such as rules data and definitions, and receive outputs related to the processes performed therein, the client nodes being located at an uppermost tier and connected to the at least one application server;
    a data synchronization scheme that includes functionality to store subsets of information that have a high probability for use by a client node; and
    rules that identify the subsets of information for a particular user encounter, the rules adaptive in nature such that the operation of the system is continually monitored and, based on past performance, updated probabilities are generated relating to the type of data that will be used to backfill during a particular encounter.

2. The apparatus of claim 1, wherein the subsets of information are stored at the intermediate tier.

3. The apparatus of claim 1, wherein the rules are predetermined.

4. The apparatus of claim 1, wherein the data synchronization scheme caches data from the base tier to the intermediate tier to populate initial screens required at the client nodes during a user encounter.

5. The apparatus of claim 4, wherein the data synchronization scheme back-fills from the base tier data required at a client node during a user encounter that was not cached within the intermodiate tiers.

6. The apparatus of claim 5, wherein the back-filled data is ordered to anticipate a user's requirements for non-cached data at the time of the user encounter.

7. The apparatus of claim 1, wherein the data synchronization scheme back-fills the subsets of information from the base tier to the intermediate tier during a user encounter.

8. The apparatus of claim 7, wherein the backfilled data is ordered by the current state of the apparatus relationship with that particular user at the particular client node at the time of the user encounter.

9. The apparatus of claim 1, wherein the data synchronization scheme stores subsets of information within the intermediate tier by the time that the subsets of information is called for at a particular client node.

10. The apparatus of claim 1, wherein if an encounter is initiated with a user for whom an open commitment exists, the data synchronization scheme stores appropriate detailed commitment status data from the base tier to the intermediate tier based on a likelihood that this data will soon be requested at the client node.

11. A system comprising:
    a central server that includes a data storage device, and a business object generator that generates business objects that contain abstracted business logic;
    a computational platform in connection with the central server that performs computation-based functions under the direction of rules and metadata used by the business objects;
    at least one intermediate server in connection with the base server via a message bus where the intermediate server includes a presentation object generator to generate presentation objects based on the business objects, the presentation objects being specific to a particular user of the system;

at least one user interface that receives and displays presentation objects, and provides requests to the intermediate server to retrieve information and to have processes performed at the base server; and a data cache associated with the intermediate server to store presentation objects to be sent to the at least one user interface in advance of a request from the user interface, the data cache to populate initial screens requested by the user interface.

12. The system of claim 11 wherein the data in the data cache is inferentially back-filled to anticipate requests from the user interface by the time that the data is requested from the user interface.

13. The system of claim 11 wherein the operation of the system is continually monitored and based on past performance, updated probabilities are generated relating to the type of data which will be stored in the data cache during a particular user encounter.

14. The system of claim 11, wherein the data storage device includes a relational database.

15. The system of claim 14, wherein the intermediate server provides object-to-relational mapping for the presentation objects to the business objects in the base server.

16. The system of claim 11, wherein the intermediate server and the user interface are connected via a data network.

17. The system of claim 16, wherein the data network is the world wide web.

18. The system of claim 16, wherein the data network is a local area network.

19. The system of claim 11, wherein the intermediate server is located remote from the base server and the message bus is provided via a communications network.

20. An apparatus for processing information according to a particular application, comprising:

a computational platform for performing computation-based functions on generic data units independent of the particular application;

an interface that provides for receipt and transmission of data related to the particular application, and provides rules and metadata to the computational platform to convert the generic data units to units associated with the particular application;

an output device for providing an application specific output based on the data units, the application specific output including one of a data content and a data format that is specific to the particular application;

a messaging service that provides for transport of information between the computational platform, the memory, and the output device; and a data staging service that caches high interest data for the output device, the data staging service to use cached data to populate initial screens requested by a client node.

21. The apparatus of claim 20, wherein the computational platform includes at least one processing engine that performs computation based functions free from elements specific to the particular data processing application, the at least one processing engine comprising at least one of:

a customer summary engine that accesses and provides customer summary information through the output device;

a translation engine that provides for conversion of data formats received and transmitted from the computational platform;

a rating engine that provides for computation of charges related to a service event;

a billing engine that rates services provided at an aggregate level;

a user interface engine that controls information movement to and from the interface; and an output engine that provides for outputting of reports.

22. The apparatus of claim 20, further comprising a central server associated with the computational platform and at least one intermediate server located between the central server and the output device, wherein the data staging service, based on information received from the output device, retrieves information from the central server and stores the information in a local memory.

23. The apparatus of claim 22, wherein a connection is established between the local memory and the output device over a local area network.

24. The apparatus of claim 22, wherein a connection is established between the local memory and the output device over the world wide web.

25. The apparatus of claim 20, wherein the data staging service provides the capability to intelligently back-fill data requested at a client node from the computational platform.

26. The apparatus of claim 25, wherein the intelligent back-fill capability is driven by the current state of a service provider's relationship with a particular customer at the time of an encounter.

27. The apparatus of claim 25, wherein the intelligent back-fill capability is used to anticipate client node requests for non-cached data.

28. The apparatus of claim 25, wherein the intelligent back-fill capability is adaptive in nature so that the operation of the system is monitored and based on past performance, updated probabilities are generated relating to the type of data which will be used to backfill.

29. A method comprising;

containing data which will be retrieved for an encounter with a user in a master database;

providing relevant information for the user to an intermediate tier from the master database;

storing the relevant information in a data cache;

making the relevant information accessible to the user at a client node; and backfilling further relevant information in the data cache to anticipate user requests for non-cached data, the backfilling adaptive in nature so that the operation at the client node is monitored and, based on past performance, updated probabilities are generated relating to the type of data which will be used to backfill.

30. The method of claim 29, further comprising backfilling to transition appropriate detailed commitment status data from the master database to the data cache, if an encounter is initiated with a user for whom an open commitment exist.

31. The method of claim 29, further comprising populating initial screens required by the client nodes during an encounter with the user.

32. The method of claim 29, further comprising if an open commitment exists for the user, storing appropriate detailed commitment status data from the base tier to the intermediate tier.

33. An apparatus comprising:

a central server located at a base tier to provide services for the system;

a database located at the base tier connected to the central server;

at least one application server to perform functions relevant to the location it is serving, the application server being located at an intermediate tier connected to the central server;

client nodes through that system users may enter application specific data, such as rules data and definitions, and receive outputs related to the processes performed therein, the client nodes being located at an uppermost tier and connected to the at least one application server; and a data synchronization scheme that includes functionality to store subsets of information that have a high probability for use by a client node, the data synchronization scheme to cache data from the base tier to the intermediate tier to populate initial screens required at the client nodes during a user encounter.

34. The apparatus of claim 33, wherein the data synchronization scheme back-fills from the base tier data required at a client node during a user encounter that was not cached within the intermediate tiers.

35. The apparatus of claim 34, wherein the back-filled data is ordered to anticipate a user's requirements for non-cached data at the time of the user encounter.

* * * * *